(12) United States Patent
Lazaridis et al.

(10) Patent No.: US 8,930,514 B2
(45) Date of Patent: Jan. 6, 2015

(54) SYSTEM AND METHOD FOR CONDUCTING PEER-TO-PEER (P2P) COMMUNICATIONS

(75) Inventors: Mihal Lazaridis, Waterloo (CA); Henry Yao-Tsu Chen, Waterloo (CA); David Bukurak, Ottawa (CA); Theban Ganeshalingam, Mississauga (CA); Munish Taneja, Toronto (CA)

(73) Assignee: Blackberry Limited, Waterloo (CA)

( * ) Notice: Subject to any disclaimer, the term of this patent is extended or adjusted under 35 U.S.C. 154(b) by 481 days.

(21) Appl. No.: 13/157,537

(22) Filed: Jun. 10, 2011

(65) Prior Publication Data

US 2012/0317204 A1   Dec. 13, 2012

(51) Int. Cl.
   *G06F 15/173*   (2006.01)
   *H04W 4/20*   (2009.01)
   *H04L 29/06*   (2006.01)
   *H04W 4/00*   (2009.01)

(52) U.S. Cl.
   CPC ........... *H04W 4/206* (2013.01); *H04L 63/0846* (2013.01); *H04W 4/008* (2013.01)
   USPC .......................................... 709/223; 709/226

(58) Field of Classification Search
   USPC ....................................................... 709/223
   See application file for complete search history.

(56) References Cited

U.S. PATENT DOCUMENTS

| 7,590,073 B2 | 9/2009 | Beckmann et al. | |
| 2005/0058094 A1 | 3/2005 | Lazaridis et al. | |
| 2006/0111081 A1 | 5/2006 | Whittington et al. | |
| 2008/0028055 A1* | 1/2008 | Dolev et al. | 709/222 |
| 2012/0176932 A1* | 7/2012 | Wu et al. | 370/254 |

FOREIGN PATENT DOCUMENTS

| EP | 1536661 A2 | 6/2005 |
| EP | 2120408 A1 | 11/2009 |
| WO | WO 2004/059417 A2 | 7/2004 |

OTHER PUBLICATIONS

Matt, Stefan; Search Report from corresponding European Application No. 11169650.6; search completed Oct. 14, 2011.

* cited by examiner

*Primary Examiner* — Shaq Taha
(74) *Attorney, Agent, or Firm* — Brett J. Slaney; Blake, Cassels & Graydon LLP

(57) ABSTRACT

A method and system are provided which enable an alternative identifier to be used instead of a normally used identifier such as a personal identification number (PIN) in a peer-to-peer (P2P)-based system. The alternative identifier can be used to avoid divulging the normally used identifier and can be cancelled or de-activated at a later time or can be converted to the normally used identifier at a later point.

20 Claims, 17 Drawing Sheets

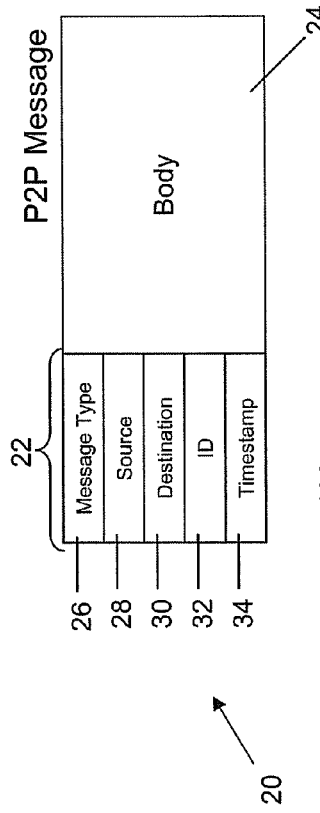
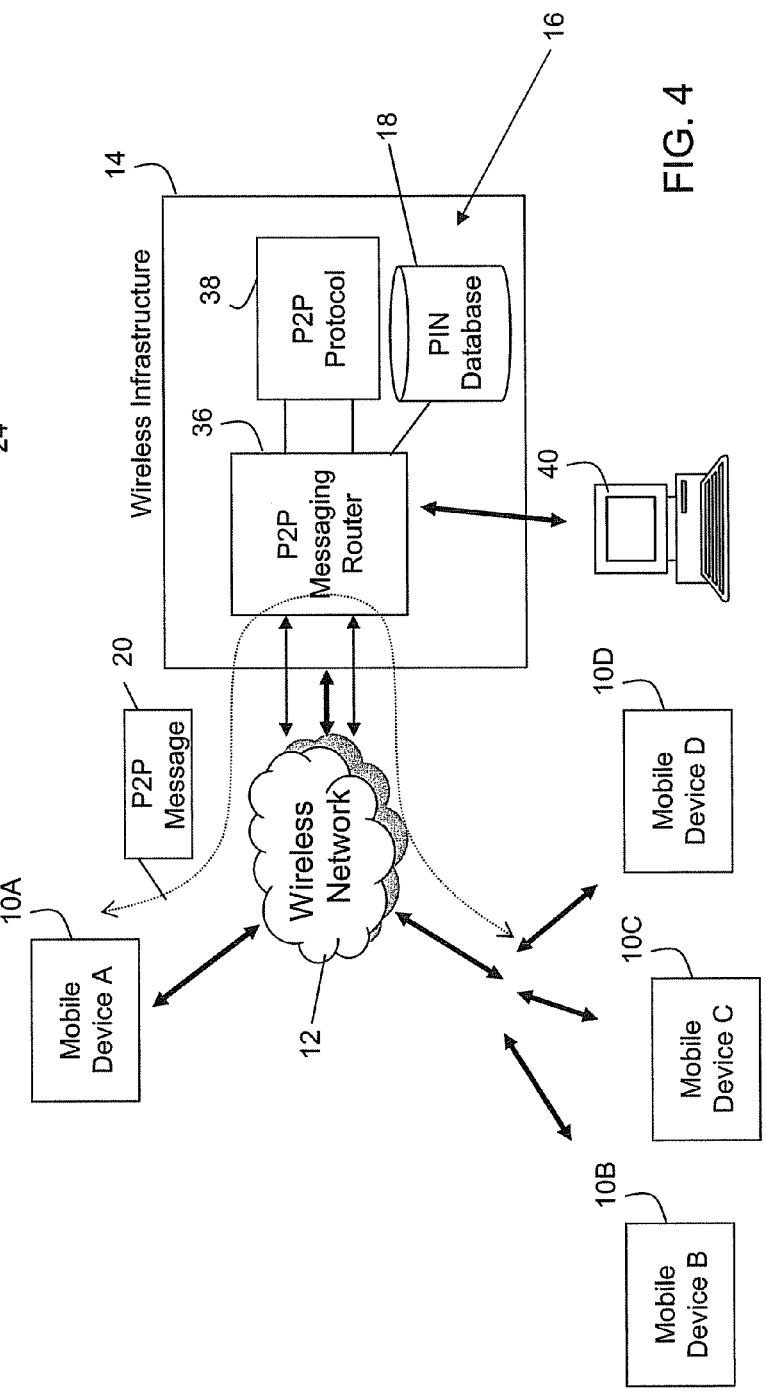

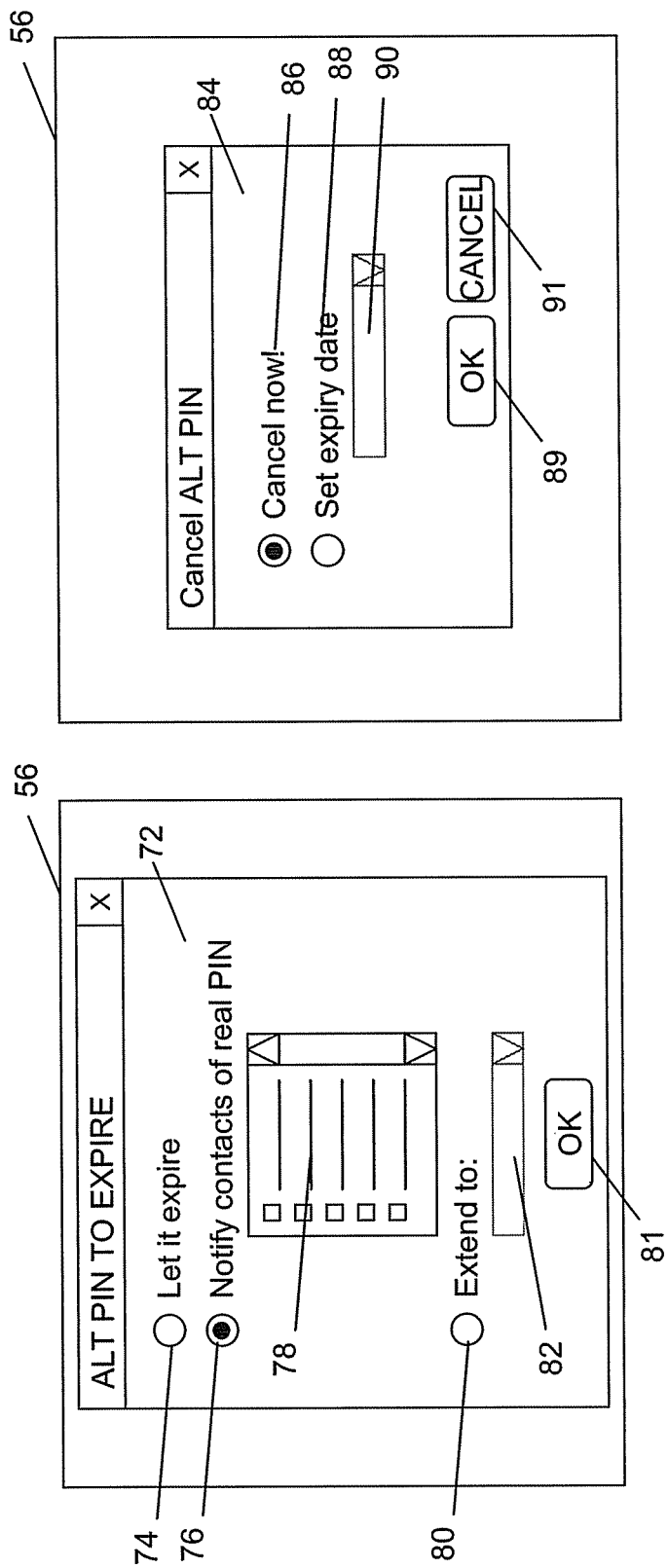

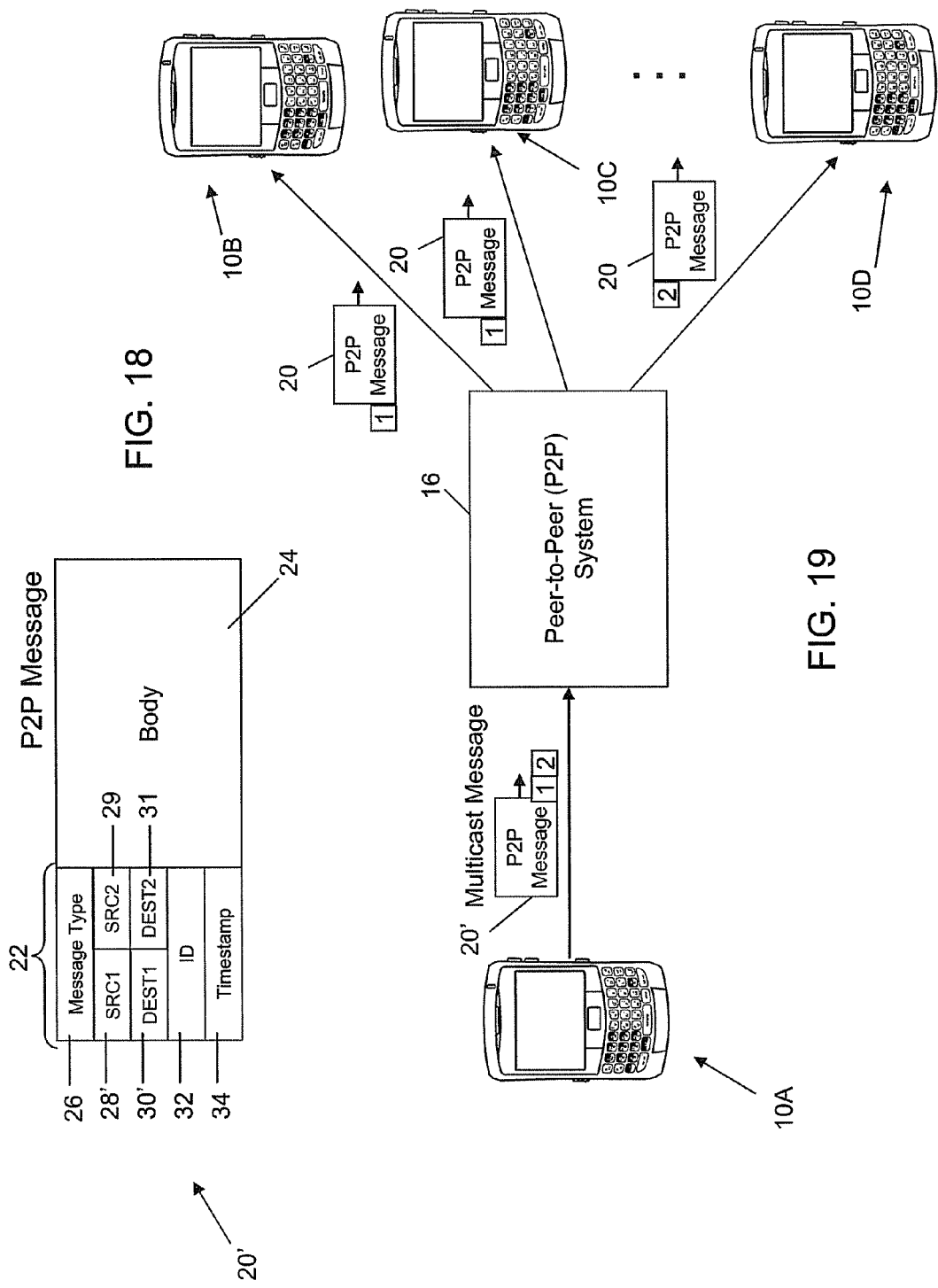

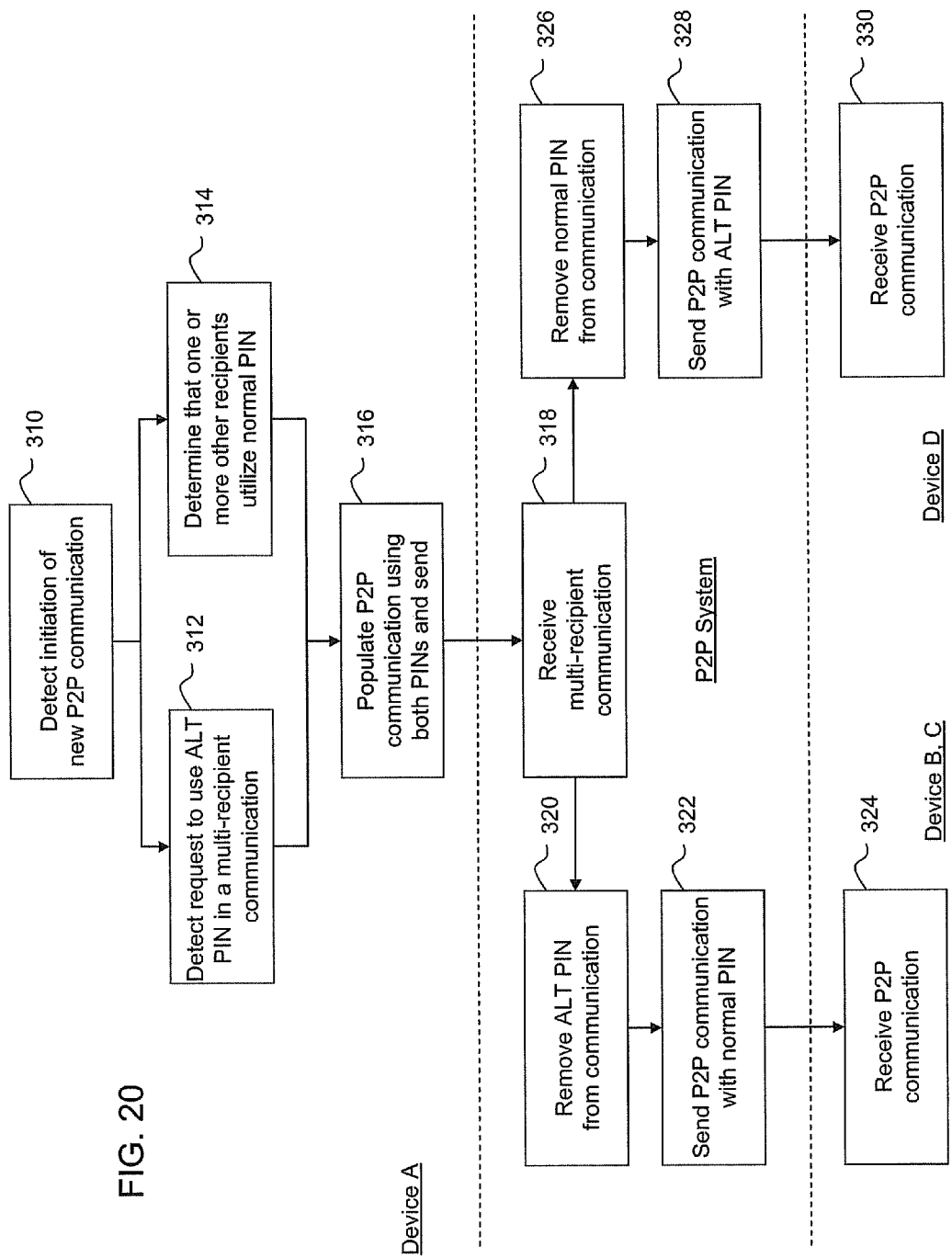

US 8,930,514 B2

SYSTEM AND METHOD FOR CONDUCTING PEER-TO-PEER (P2P) COMMUNICATIONS

TECHNICAL FIELD

The following relates generally to mobile networking, and more particularly, to peer-to-peer (P2P) communications and systems and methods for conducting same.

BACKGROUND

Mobile communications devices such as smart phones are often equipped with various applications utilizing various communication media. To avoid receiving at least some communications, users may attempt to avoid giving out addresses or identifiers that enable others to contact them at the user's device. Despite attempting to avoid giving out the identifiers, others may still request them from the user, for example by asking them personally.

BRIEF DESCRIPTION OF THE DRAWINGS

Embodiments will now be described by way of example only with reference to the appended drawings wherein:

FIG. 3 is a block diagram depicting an example of a P2P message.

FIG. 4 is a block diagram illustrating one example configuration for the wireless infrastructure and P2P system shown in FIG. 1.

FIG. 9 is a screen shot of an example of a user interface for selecting an option upon reaching an expiry date for an alternative PIN.

FIG. 10 is a screen shot of an example of a user interface for cancelling an alternative PIN.

FIG. 18 is a block diagram illustrating an example of a P2P message configured to include both a normal PIN and an alternative PIN in the same message.

FIG. 19 is a block diagram of an example of a communication of a multi-cast P2P message in accordance with the configuration shown in FIG. 18.

FIG. 20 is a flow chart illustrating another example of a set of computer executable instructions for utilizing a P2P message in accordance with the configuration shown in FIG. 18.

DETAILED DESCRIPTION OF THE DRAWINGS

Figure 1:
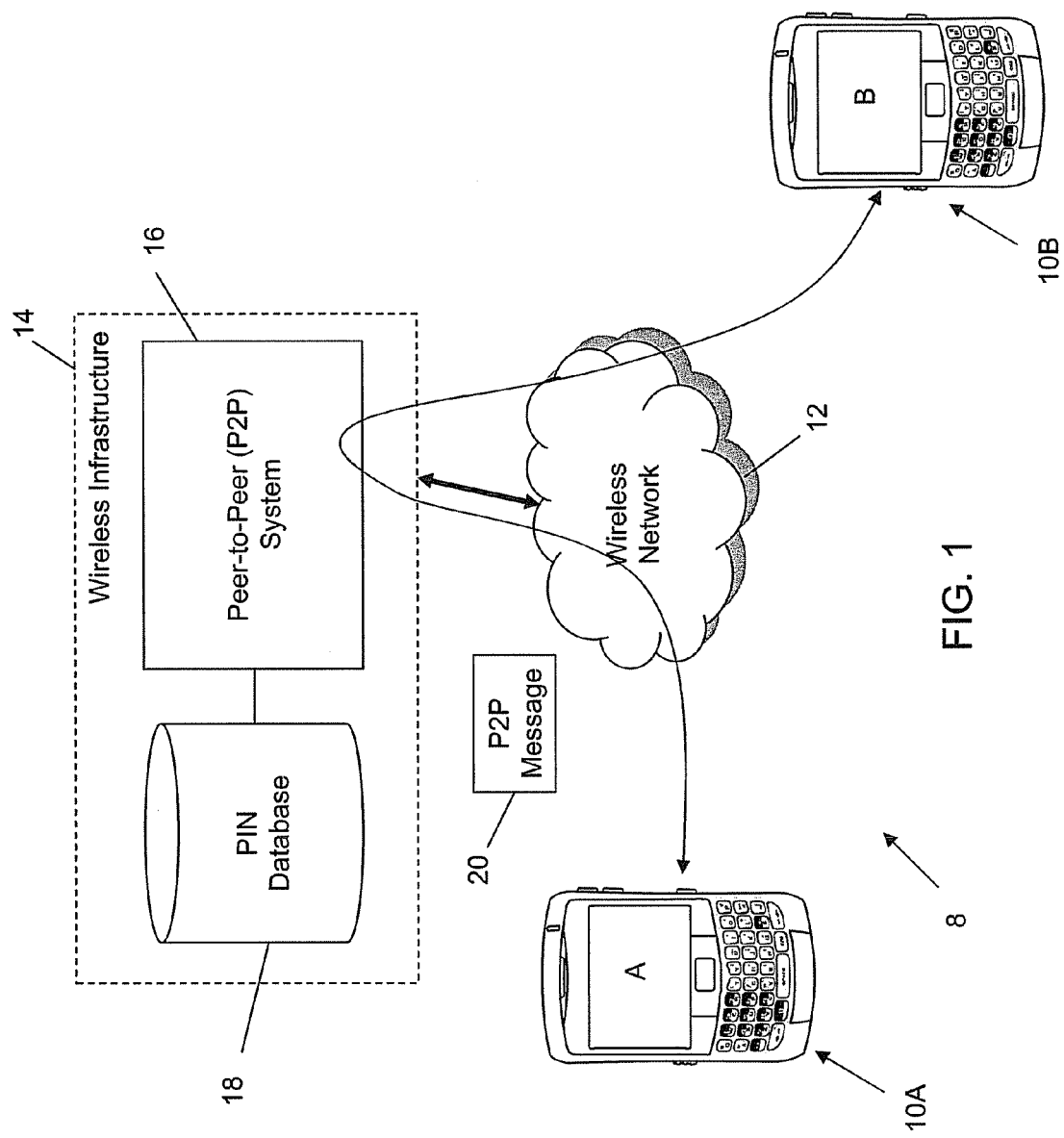
FIG. 1 is a block diagram of an example of a wireless communication network comprising a peer-to-peer (P2P) system.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practised without these specific details. In other instances, well-known methods, procedures and components have not been described in detail so as not to obscure the example embodiments described herein. Also, the description is not to be considered as limiting the scope of the example embodiments described herein.

It has been recognized that to avoid having to refuse the provision of a peer-to-peer (P2P) based identifier such as a PIN, or to otherwise safeguard the PIN, a temporary or alternate PIN can be used. By creating a temporary or alternative PIN, a device's normal, existing PIN can be protected while enabling communications with other devices using the alternative PIN. This enables a user to determine whether or not they wish to communicate with a particular individual on an ongoing basis, wherein if not, the alternative PIN can be cancelled. Conversely, if at some point the user determines that they wish to maintain the connection with a particular individual who has been given the alternative PIN, they may have that individual's device convert or otherwise replace the alternative PIN with the normal, existing PIN for communicating on an ongoing basis going forward.

By enabling alternative PINs to be utilized, the user does not have to outwardly refuse to provide their normal PIN or be forced to provide a fake PIN. Instead, they can provide the alternative PIN, which can expire or be cancelled at some later time, which can be done automatically and transparently to the other individual. Moreover, should they wish to continue communicating with that individual, the normal PIN can be provided at an appropriate time, which can also be done transparently. It will be appreciated that although the following examples refer to PINs, the principles apply to any suitable P2P-based identifier (e.g. unique identifier or address).

Although the principles discussed below are applicable to any electronic communication device or network access devices, examples will be provided for a mobile communication device, which is one of many types of electronic communication devices.

For clarity in the discussion below, mobile communication devices may be commonly referred to as "mobile devices" for brevity. Examples of applicable mobile devices may include, without limitation, cellular phones, smart-phones, wireless organizers, pagers, personal digital assistants, computers, laptops, handheld or other wireless communication devices, wirelessly enabled notebook computers, portable gaming devices, tablet computers, or any other portable electronic device with processing and communication capabilities.

Turning to FIG. 1, an example of a communication network 8 is shown. The communication network 8 in this example, at least in part, enables mobile devices, commonly referred to by numeral 10 (or using numeral 10 as a prefix—e.g. mobile device A, also denoted by 10A and mobile device B, also denoted by 10B), to communicate via a peer-to-peer (P2P) system 16 via a wireless network 12. It will be appreciated that two mobile devices 10A, 10B shown in FIG. 1 are for illustrative purposes only and many other mobile devices 10 (not shown) may also be capable of communicating with or within the communication system 8. It will also be appreciated that although the examples shown herein are directed to mobile communication devices, the same principles may apply to other devices capable of communicating with the P2P system 16. For example, an application (not shown) hosted by a desktop computer or other "non-portable" or "non-mobile" device may also be capable of communicating with other devices (e.g. including mobile devices 10) using the P2P system 16.

The P2P system 16 is, in this example, a component of a wireless infrastructure 14 associated with the wireless network 12. The wireless infrastructure 14 in this example comprises, in addition to the P2P system 16, and among other things not shown for simplicity, a person identification number (PIN) database 18. The PIN database 18 in this example is used to store one or more PINs associated with particular mobile devices 10, whether they are subscribers to a service provided by the wireless infrastructure 14 or otherwise.

The mobile device 10A may communicate with the mobile device 10B and vice versa via the P2P system 16, in order to perform P2P messaging or to otherwise exchange P2P-based communications, as will be explained in greater detail below. For ease of explanation, in the following examples, any P2P-based communication may also be referred to as a P2P message 20 as shown in FIG. 1.

Figure 2:
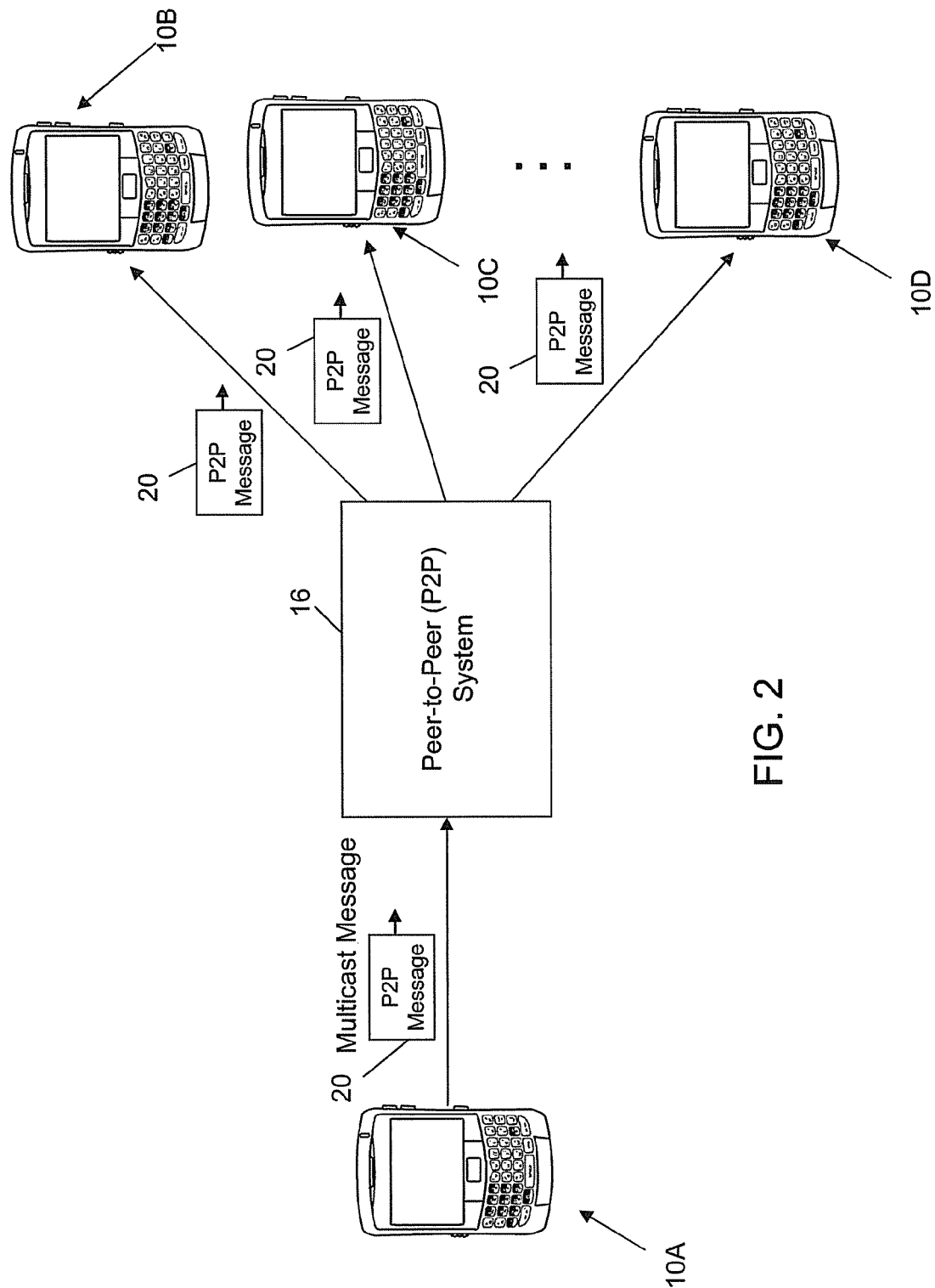
FIG. 2 is a block diagram of an example of a communication of a multi-cast P2P message communicated via the P2P system of FIG. 1.

In some embodiments, the P2P system 16 may be capable of sending multi-cast messages, i.e. forwarding a single message from a sender to multiple recipients without requiring multiple messages 20 to be generated by such sender. For example, as shown in FIG. 2, the P2P system 16 can be operable to enable a single P2P message 20 to be sent to multiple recipients by addressing the P2P message 20 to multiple corresponding P2P addresses, and having the P2P system 16 multicast the message 20 to those recipients. In the example shown in FIG. 2 a multicast approach enables the sender (mobile device 10A) to only require one message 20 in order to send the same data to multiple recipients (mobile devices 10B, 10C, and 10D for example).

An example P2P message 20 is shown in greater detail in FIG. 3, and has a format that is particularly suitable for a PIN-to-PIN based system. In a typical P2P protocol 38 (see also FIG. 4), each P2P message 20 has associated therewith a source corresponding to the mobile device 10 which has sent the P2P message 20 and includes a destination identifying the one or more intended recipients. Each P2P message 20 in this example comprises a body 24, which contains the content for the P2P message 20 (e.g. text or other data), and a header 22, which contains various fields used for transmitting and processing each P2P message 20. In this example, the header 22 includes a message type field 26 to specify the type of transmission (e.g. chat, registration, block, presence, etc.), a source field 28 to specify the device address for the sender, a destination field 30 to specify the device address(es) for the one or more intended recipients, an ID field 32 to identify the corresponding P2P application 44 (see also FIG. 5) and a timestamp field 34 to indicate the time (and if desired, the date) at which the P2P message 20 was sent by the designated sender.

It can be appreciated that in this example, the ID field 32 can be used to specify the application ID to identify a P2P application 44 on the mobile device 10. Where the P2P application 44 relates to, for example, an instant messaging (IM) system, the message type field 26 can also be used to designate an IM communication, and the ID field 32 would then correspond to a conversation ID, i.e. a conversation thread the message 20 corresponds to (e.g. such that each message 20 is identified by the conversation in which it was sent).

It will be appreciated that other information or attributes may be included in the P2P message 20, such as a subject field (not shown) to enable a subject for part or all of a conversation (in an IM embodiment) to be transported with the P2P message 20 (e.g. to create new subjects, modify subjects, notify others of subjects, etc.), or application details field (not shown) to provide application-specific information such as the version and capabilities of the application.

Turning now to FIG. 4, a configuration is shown that is suitable for a user of mobile device A, hereafter referred to as mobile device 10A, to conduct a P2P communication (e.g. instant messaging) with buddies included in a contact list (not shown). It can be seen in FIG. 4 that the P2P system 16 is incorporated into the wireless infrastructure 14 of the wireless network 12. The P2P system 16 can utilize any suitable P2P protocol 38 operated by a P2P router 36, in this example as part of the wireless infrastructure 14. It can be appreciated however that a stand-alone P2P configuration (i.e. that does not rely on the wireless infrastructure 14—not shown) may equally apply the principles herein. The example configuration shown in FIG. 4 is particularly suitable for implementing a PIN-based messaging system. As can be seen, the P2P messaging router 36 may also enable mobile devices 10 to communicate with desktop computers 40 thus facilitating, for example, communications such as instant messaging (IM) between mobile applications and desktop applications on the desktop computer 40.

In the embodiment illustrated in FIG. 4, a P2P-based messaging system such as a PIN-based messaging system can be implemented using a router-based communication infrastructure, such as one that provides email, SMS, voice, Internet and other communications. Particularly suitable for hosting the P2P messaging router 36, is a wireless router or server used in systems such as those that provide push-based communication services. In FIG. 4, the wireless infrastructure 14 facilitates P2P communications such as instant messaging between mobile device 10A and mobile devices for User B, User C and User D, denoted by 10B, 10C and 10D respectively using the P2P messaging router 36. It will be appreciated that the number of users participating in the example shown in FIG. 4 is for illustrative purposes only. P2P messaging, such as IM, is provided by an associated application stored on each mobile device 10A-10D which can be initiated, for example, by highlighting and selecting an icon from a display as is well known in the art. The P2P messaging router 36 routes messages between the mobile devices 10A-10D according to the P2P protocol 38. For example, the P2P protocol may define a particular way in which to conduct IM or other types of messaging.

In general, in a P2P protocol 38, the sender of the P2P message 20 knows the source address of the intended recipient, e.g. a PIN. This may be established when the two devices request to add each other to their respective contact or buddy lists. It can be seen in the example shown in FIG. 4 that mobile device 10A can communicate directly with any of the mobile devices 10B-10D through the P2P messaging router 36 as indicated by the short-dashed line without requiring a dedicated server for facilitating communications. In other words, the P2P messaging router 36 enables the mobile devices 10 to communicate with each other directly over the wireless infrastructure 14 in accordance with the P2P protocol 38.

When conducting a P2P session according to the embodiment shown in FIG. 4, the mobile devices 10A-10D can communicate directly with the wireless infrastructure 14 in a client based exchange where, as noted above, an intermediate server is not required. A P2P message 20 sent by one mobile device 10 is received by the wireless infrastructure 14, which obtains the source address for the intended recipient (or recipients) from information associated with the message 20 (e.g. a data log) or from the message 20 itself. Upon obtaining the recipient's address according to the P2P protocol 38, the wireless infrastructure 14 then routes the message 20 to the recipient associated with the mobile device 10 having such address (or recipients having respective addresses). The wireless infrastructure 14 typically also provides a delivery confirmation to the original sender, which may or may not be displayed to the user. The destination device can also provide such delivery information. The wireless infrastructure 14 should be capable of routing P2P messages 20 reliably and hold onto the P2P messages 20 until they are successfully delivered. Alternatively, if delivery cannot be made after a certain timeout period, the wireless infrastructure 14 may provide a response indicating a failed delivery. The wireless infrastructure 14 may choose to expire a message 20 if a certain waiting period lapses.

Figure 5:
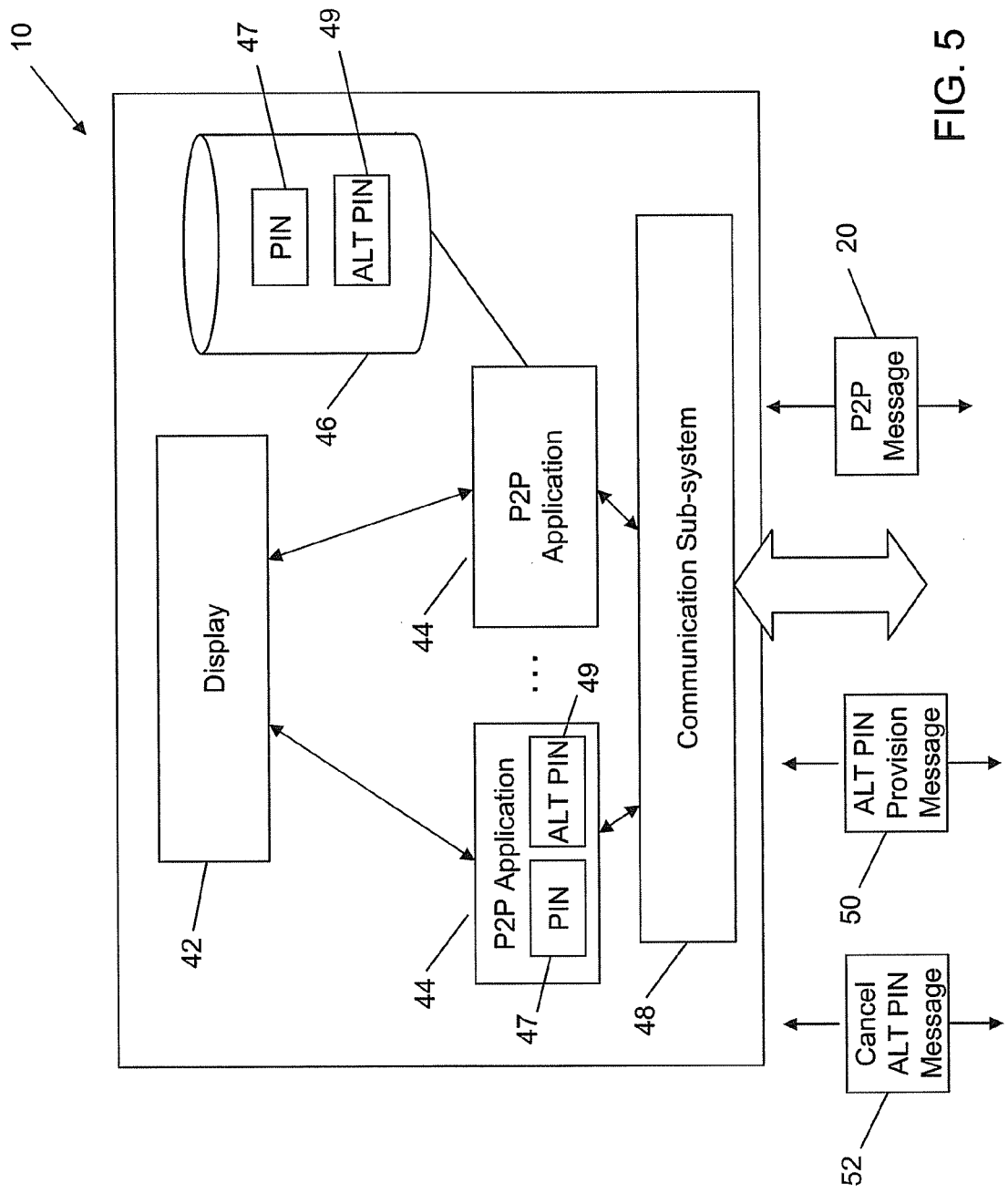
FIG. 5 is a block diagram of an example configuration for a mobile device.

FIG. 5 illustrates an example configuration for a mobile device 10. In this example, the mobile device 10 hosts or otherwise comprises one or more P2P applications 44, which are operable to communicate in P2P-based communications. The P2P applications 44 may communicate via a communication sub-system 48 for exchanging P2P messages 20 with other devices having a similar or compatible P2P application 44. The P2P applications 44 may also provide an output on the mobile device 10 such as a graphical user interface (GUI) using a display module 42.

The P2P applications 44 in this example utilize a source address such as a PIN 47, which may be provisioned to the mobile device 10 in various ways, e.g. at the time of manufacturer, during a registration process, etc. The PIN 47 is used to enable the P2P system 16 to direct a P2P message 20 to one or more intended recipients as explained above. In order to protect the PIN 47 or otherwise enable the use of a temporary or alternative identifier, an alternative (ALT) PIN 49 is also available to the P2P applications 44. As will be explained in greater detail below, the ALT PIN 49 may be created either on the mobile device 10 or by another entity such as a component of the wireless infrastructure 14, e.g. the P2P system 16. In this example, the ALT PIN 49 can be provisioned on the mobile device 10 using an ALT PIN provision message 50 (e.g. comprising a request to generate an ALT PIN 49 or comprising the ALT PIN 49 itself). The ALT PIN 49 may either be generated/activated, deactivated, and re-activated, or simply generated and cancelled. In this way, the ALT PIN 49 can be provided on a temporary basis and after detecting a predetermined input such as an expiry date, be replaced with the PIN 47. The deactivation, expiry or cancellation may be initiated and/or effected using a cancel ALT PIN message 52. As discussed below, the ALT PIN 49 may expire at a predetermined date, such an expiry date can be extended, the ALT PIN 49 may be permanently cancelled, and the user may be provided an option to convert or otherwise have the ALT PIN 49 replaced for one or more other devices to the normal, existing PIN 47. As shown in FIG. 5, the PIN 47 and ALT PIN 49 may be made available to one or more of the P2P applications 44 via a PIN data store 46 or may be stored or otherwise known within particular P2P applications 44. The ALT PINs 49 may be generated directly within a P2P application 44 or a separate application (not shown) may be provided for generating ALT PINs 49.

Figure 6:
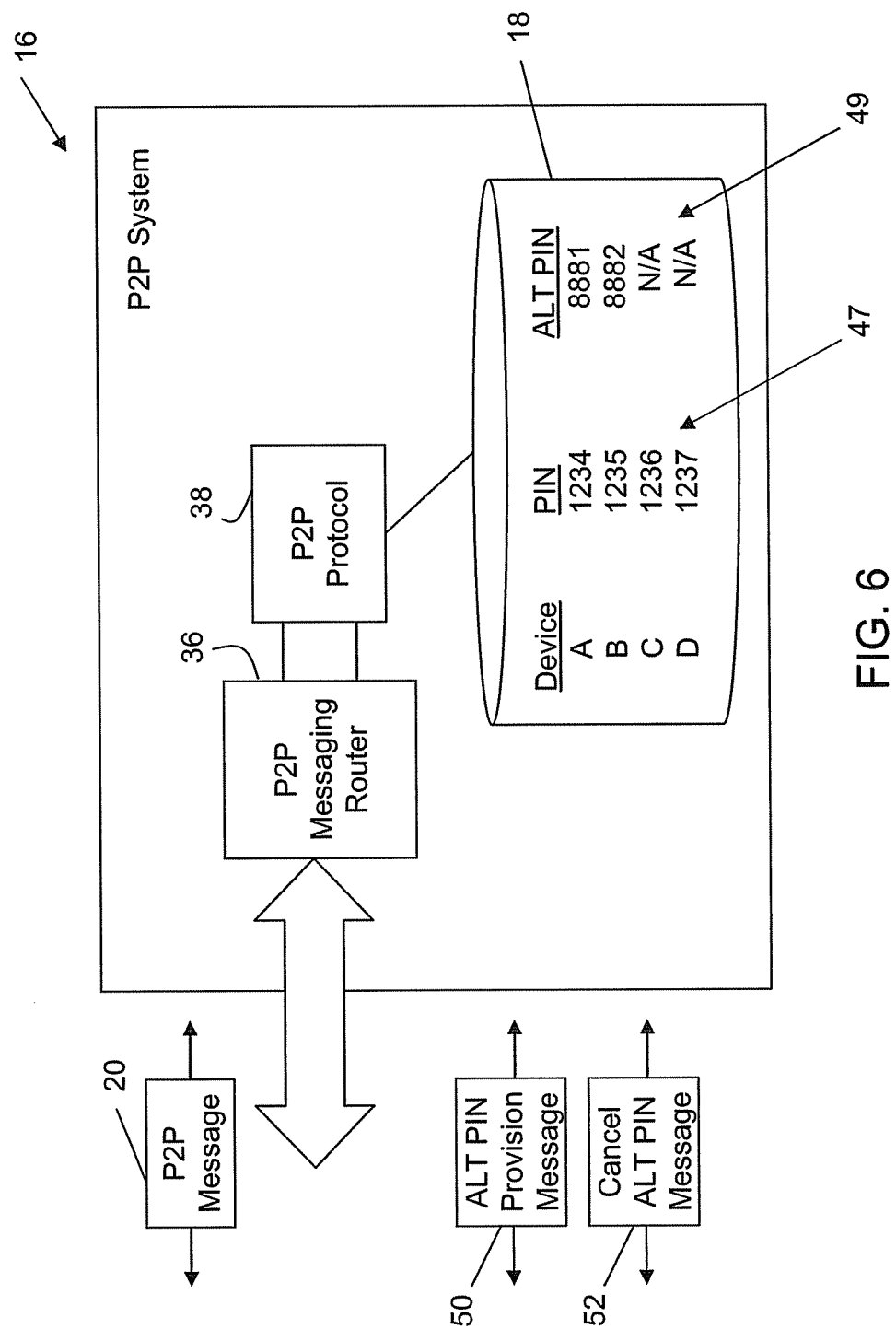
FIG. 6 is a block diagram of an example of a configuration for the P2P system shown in FIG. 1.

An example configuration for the P2P system 16 is shown in FIG. 6. As discussed above, a P2P messaging router 36 may utilize a P2P protocol 38 in order to enable various devices to conduct P2P communications. The devices, such as mobile devices 10A-10D normally comprise PINs 47, copies or indications of which are stored by the P2P system 16 in a PIN database 18. For mobile devices 10 that have generated or obtained an ALT PIN 49, the P2P system 16 stores such ALT PINs 49 in the PIN database 18 to enable the P2P system 16 to not only recognize the normal PINs 47 but also the ALT PINs 49. It can be seen that in the illustrative example shown in FIG. 6, devices 10A and 10B comprise ALT PINs 49 while devices 10C and 10D do not. As such, for example, mobile device 10A is capable of conducting a P2P communication with any other compatible device using their ALT PIN 49 in order to, for example, avoid divulging their normal PIN 47, whereas, for example, mobile device 10D can only utilize their normal PIN 47 (even if they are communicating with another device's ALT PIN 49). As shown in FIG. 6, the P2P system 16 is also operable to obtain and process both ALT PIN provision messages 50 and cancel ALT PIN messages 52. As discussed above, the provision messages 50 may be used to request the P2P system 16 to generate an ALT PIN 49 for a mobile device 10 and return it thereto, or may provide an indication of an ALT PIN 49 generated by that mobile device 10. The cancel ALT PIN message 52 can be used to request the P2P system 16 to cancel or de-activate an ALT PIN 49 in the PIN database 18 such that subsequent P2P communications cannot utilize that ALT PIN 49.

Figure 7:
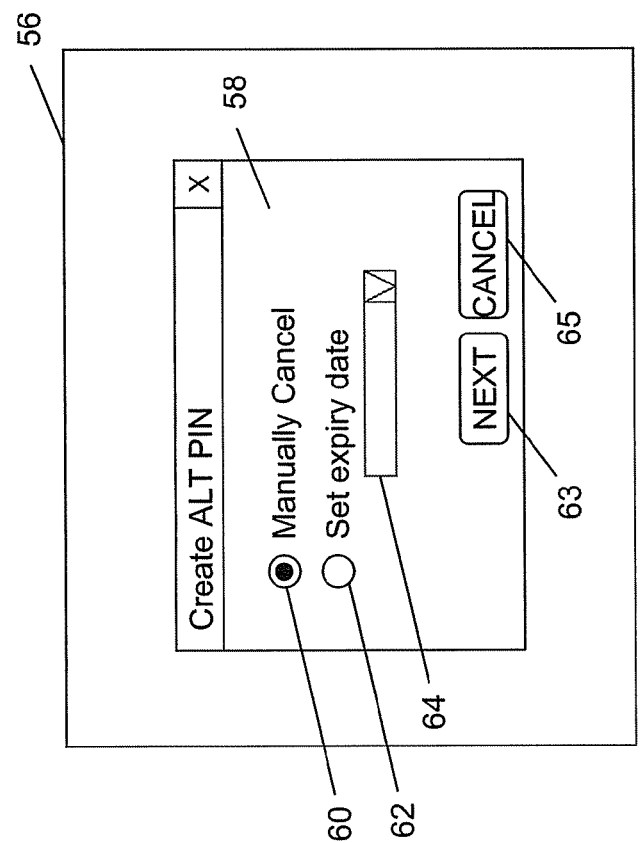
FIG. 7 is a screen shot of an example of a user interface for one step in creating a new alternative PIN.

FIG. 7 illustrates a display screen 56 for a mobile device 10 displaying an example Create ALT PIN user interface (UI) 58. The Create ALT PIN UI 58 in this example is provided as a multi-step UI or "wizard" in order to provide the ability to select multiple options associated with creating an ALT PIN 49. It can be appreciated that instead of a wizard, the ALT PIN 49 may be generated immediately, e.g. using default options and a preferences interface (not shown) provided upon request to select or modify such options. In the first step of the wizard shown in FIG. 7, the user may choose to either select a manual cancellation option 60 for the ALT PIN 49, i.e. to have the ALT PIN 49 persist until a request to cancel the ALT PIN 49 is detected, or to set an expiry date option 62 to have cancellation or de-activation of the ALT PIN 49 automatically initiated on a particular date. In this example, by selecting the expiry date option 62 a date selection tool 64 can be used to select the particular date. A next button 63 may then be selected to move to the next step, or a cancel button 65 may be selected to cancel or otherwise abort the wizard.

Figure 8:
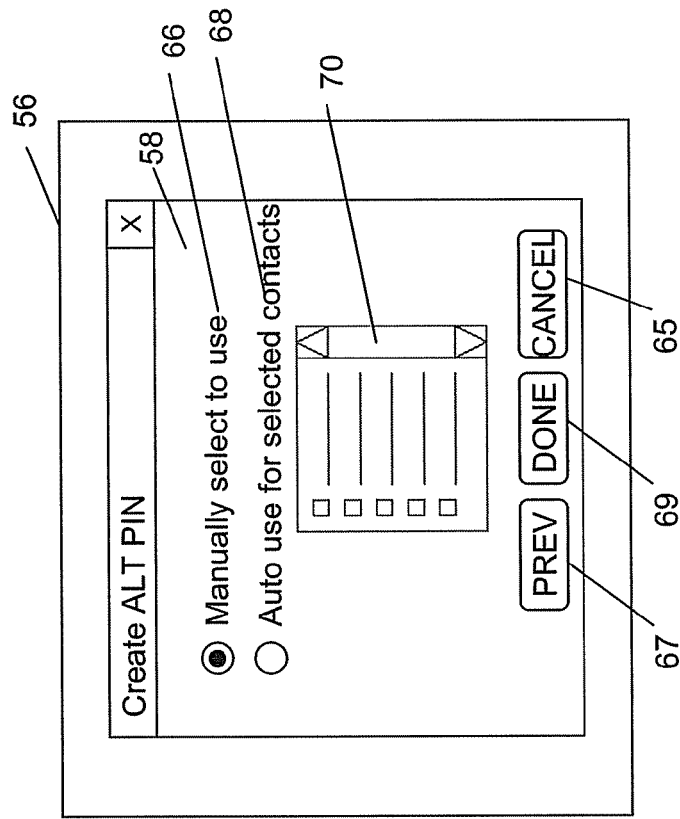
FIG. 8 is a screen shot of an example of a user interface for another step in creating a new alternative PIN.

FIG. 8 illustrates a next step provided by the Create ALT PIN UI 58, which is displayed upon detecting that the next button 63 has been selected after a selection of one of the options 60, 62 has been made. In the second step shown in FIG. 8, the user may choose a manual option 66, to have the ALT PIN 49 available for use for any contact via a manual selection (e.g. from a menu, contact list information, etc.), or an auto-use option 68, to have the ALT PIN 49 be used automatically for contacts selected from a selection tool 70. The selection tool 70 can display a list of contacts from a contact list associated with one or more of the P2P applications 44 along with checkboxes or other mechanisms to select particular contacts. It can be appreciated that the ALT PIN 49 can be available for manual selection for any non-selected contacts in the contact selection tool 70. A PREV button 67 is provided in the second step screen in order to enable the user to navigate back to the first step screen shown in FIG. 7. A Done button 69 may be selected to have the ALT PIN 49 generated with the selected preferences/options applied, or the cancel button 65 may be selected to cancel or abort the wizard. As explained above, initiating creation of an ALT PIN 49 may include generating the ALT PIN 49 on the mobile device 10 or generating a request to have another entity generate the ALT PIN 49 and return it thereto. It can be appreciated that in order to ensure that new ALT PINs 49 do not collide with existing PINs 47 across the P2P system 16, the newly generated ALT PIN 49, if not generated by the P2P system 16, can be registered and verified with the P2P system 16, examples of which will be provided below.

Turning now to FIG. 9, if an expiry date for an ALT PIN 49 has been set, an expiry notice UI 72 may be displayed. In this example, the expiry notice UI 72 allows the user to select an expire confirmation option 74, to allow the ALT PIN 49 to expire or be de-activated, to select a notify option 76, which enables one or more contacts to be notified of the normal PIN 47, or to select an extension option 80, which enables the expiry date to be extended. By selecting the extension option 80 a data selection tool 82 can be provided for selecting the new extended expiry date. By selecting an OK button 81, the selected option is applied.

FIG. 10 illustrates an example cancel ALT PIN UI 84, to enable a user to manually cancel or de-activate an ALT PIN 49. In this example, the user can choose to select a cancel now option 86, which has the ALT PIN 49 cancelled or de-activated right away, or to select an expiry date option 88, which enables the user to instead set an expiry data using a date selection tool 90. It can be appreciated that the cancel ALT PIN UI 84 can be used to set expiry dates for ALT PINs 49 after initial creation, e.g. if the user decides at a later time that they wish to set an expiry date rather than rely on manual cancellation. It can also be appreciated that by selecting the cancel now option 86, the expiry UI 72 shown in FIG. 9 (or a variant thereof) can be provided to present the user with various options, e.g. to notify contacts of their normal PIN 47.

Figure 11:
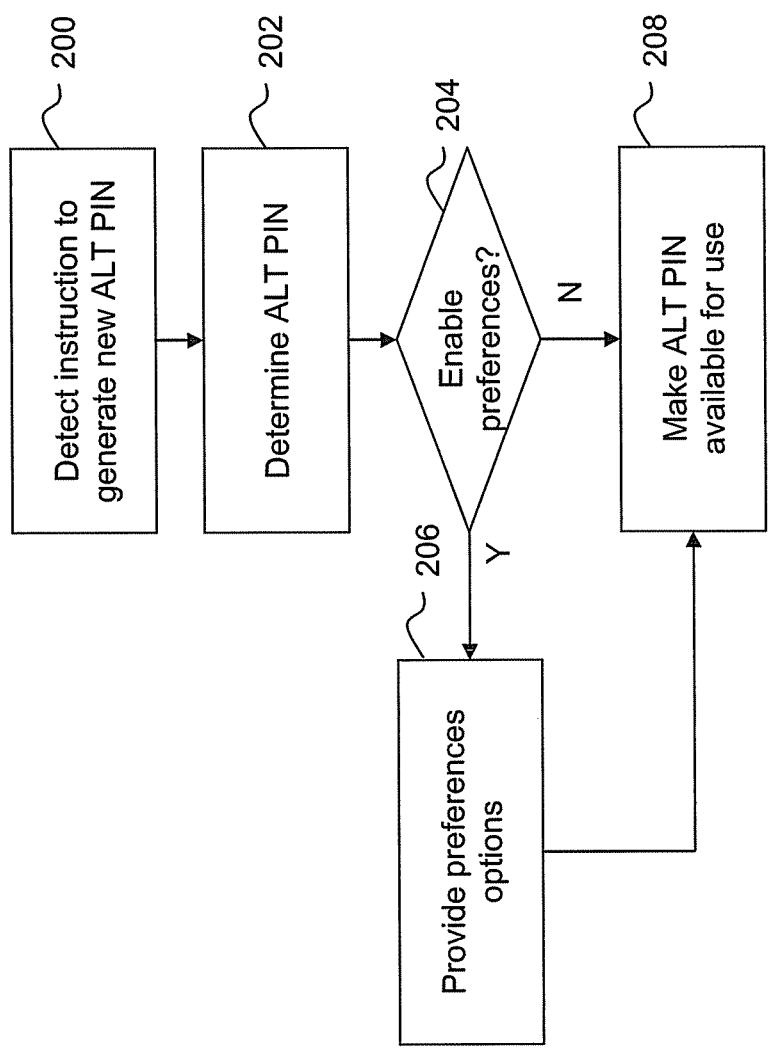
FIG. 11 is a flow chart illustrating an example set of computer executable instructions for generating a new alternative PIN.

FIG. 11 illustrates an example set of computer executable operations that may be executed by a P2P application 44 (or other PIN generation program—not shown) in order to obtain a new ALT PIN 49. At 200, an instruction (e.g. request, input, etc.) to generate a new ALT PIN 49 is detected. The new ALT PIN 29 is then determined at 202, which may be done in various ways as explained in greater detail below. At 204, it is determined if preferences or options are to be enabled upon creation (e.g. using UI 58 shown in FIGS. 7 and 8). If the preferences or options are to be enabled, the preferences options are provided at 206, e.g. using the UI 58, and the ALT PIN 49 is made available for use at 208. If default preferences are to be used upon creation, the ALT PIN 49 is made available for use immediately at 208.

Figure 12:
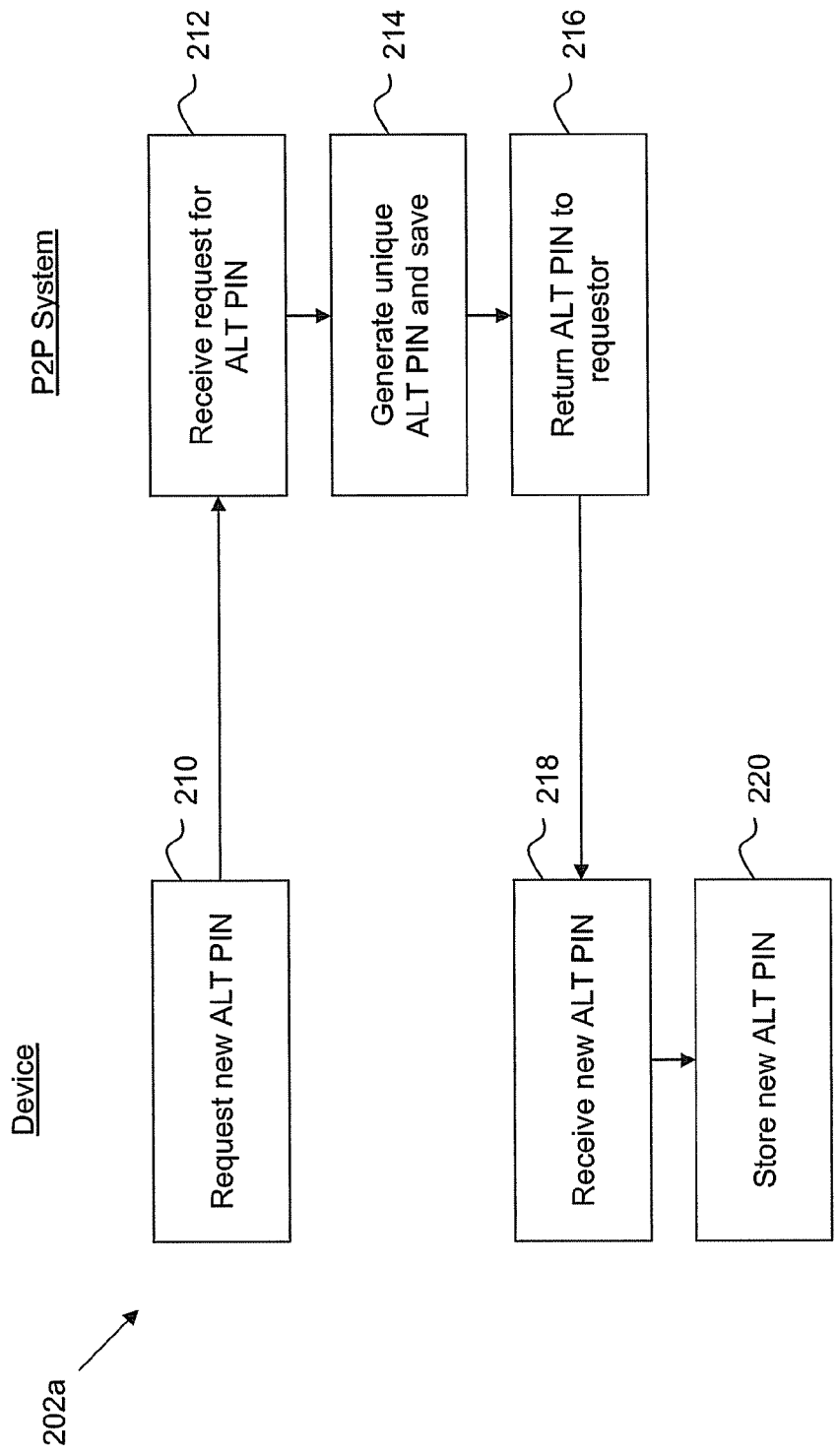
FIG. 12 is a flow chart illustrating an example set of computer executable instructions for determining a new alternative PIN.

FIG. 12 illustrates one example set of computer executable operations 202a that may be performed by the mobile device 10 and P2P system 16 to obtain the ALT PIN 49 at 202 in FIG. 11. In the example shown in FIG. 12, the mobile device 10 relies on the P2P system 16 to generate the new ALT PIN 49 in order to simplify the registration and verification process. At 210, the mobile device sends a request for a new ALT PIN 49 to the P2P system 16. The P2P system 16 receives the request for the new ALT PIN 49 at 212, and generates a unique ALT PIN 49 at 214 and saves this ALT PIN 49 in the PIN database 18. It can be appreciated that operation 214 may include a verification of the newly generated ALT Pin 49 by comparing it to existing normal PINs 47 and ALT PINs 49 that have been registered and thus are in use in the P2P system 16. If ALT PINs 49 are cancelled when they expire or are otherwise terminated, the value associated with such ALT PINs 49 can be reused. However, if ALT PINs 49 are kept but de-activated to take them out-of-usage until the mobile device 10 requests an ALT PIN 49 at a later time, a record of such de-activation may be used to enable the P2P system 16 to identify the value associated therewith (i.e. to avoid collisions with de-activated ALT PINs 49) while at the same time ensuring that it cannot be used by members of the P2P system 16. The new ALT PIN 49 is then returned to the mobile device 10 at 216, and the new ALT PIN 49 is received by the mobile device 10 at 218 and stored by the mobile device 10 in its PIN data store 46 at 220.

Figure 13:
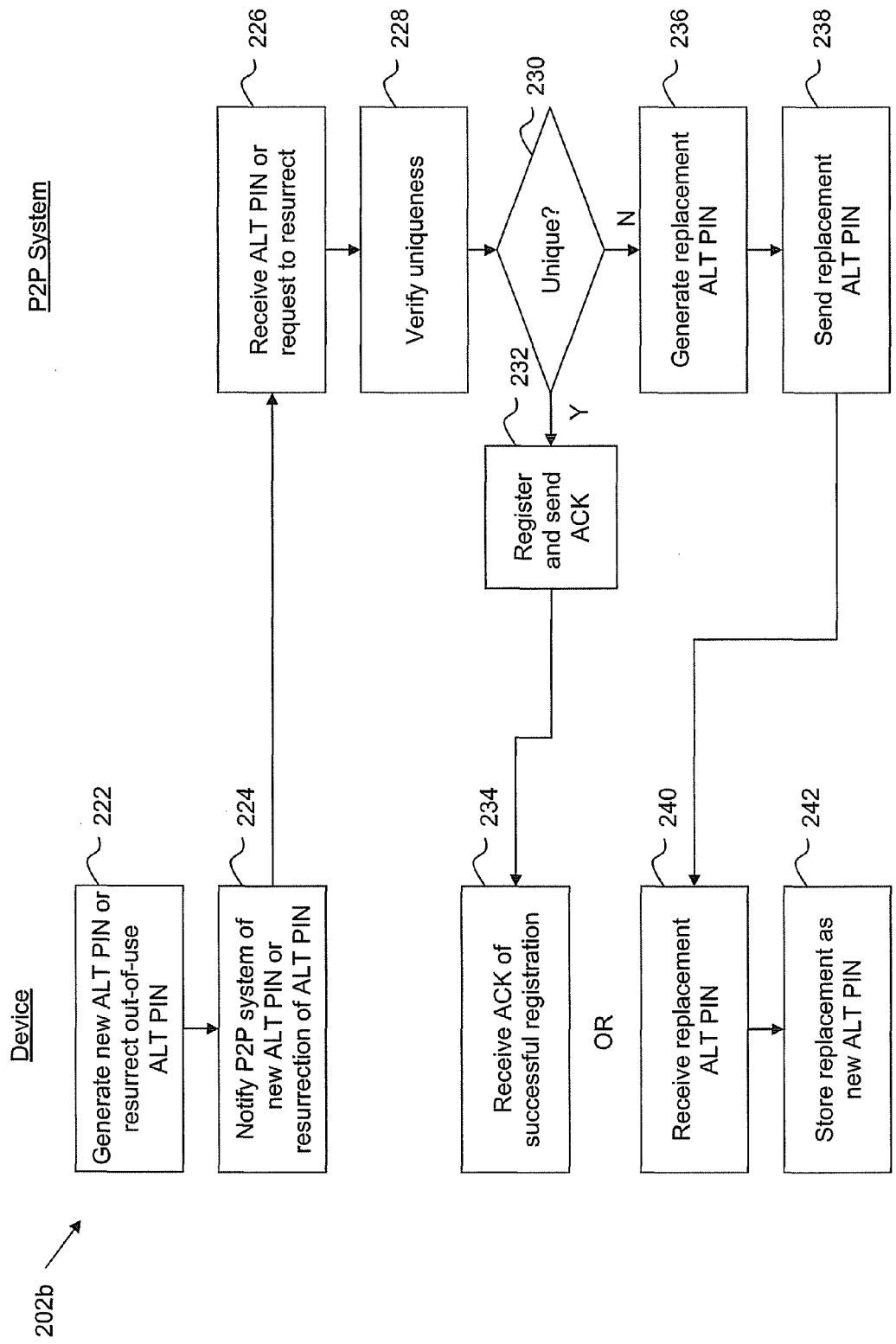
FIG. 13 is a flow chart illustrating another example set of computer executable instructions for determining a new alternative PIN.

FIG. 13 illustrates an alternative set of computer executable operations 202b that may be performed by the mobile device 10 and P2P system 16 to obtain the ALT PIN 49 at 202 in FIG. 11. In the example shown in FIG. 13, the mobile device 10 generates the new ALT PIN 49 or resurrects an out-of-use (i.e. de-activated) ALT PIN 49 at 222. The mobile device 10 then notifies the P2P system 16 of the ALT PIN 49 at 224. For example, the mobile device 10 may send a newly generated ALT PIN 49 in a provision message 50 or provide an indication that an existing ALT PIN 49 will be resurrected or reactivated on that mobile device 10 and thus should come back into active use. The P2P system 16 receives the new ALT PIN 49 or the request to reactivate an existing ALT PIN 49 at 226. The P2P system 16 then verifies the uniqueness of the newly generated ALT PIN 49 at 228. It can be appreciated that various measures can be taken to minimize collisions, e.g. by having the mobile device 10 include something unique to that device in the newly generated ALT PIN 49, etc. It can also be appreciated that for reactivating an existing ALT PIN 49, the P2P system 16 may only need to check that it has not inadvertently allowed a new ALT PIN 49 to be registered while the older ALT PIN 49 was de-activated. If it is determined at 230 that the ALT PIN 49 in question is unique, the ALT PIN 49 is registered or re-registered at 232 and an acknowledgement (ACK) is sent back to the mobile device 10. The mobile device 10 would then receive the ACK at 234, indicating the ALT PIN 49 is registered.

If it is determined at 230 that the new ALT PIN 49 or re-activated ALT PIN 49 is not unique, a replacement ALT PIN 49 at 236 and the replacement ALT PIN 49 is sent back to the mobile device 10 at 238. The mobile device 10 would then receive the replacement ALT PIN 49 at 240 and the replacement ALT PIN 49 is stored as the new ALT PIN 49 at 242.

Figure 14:
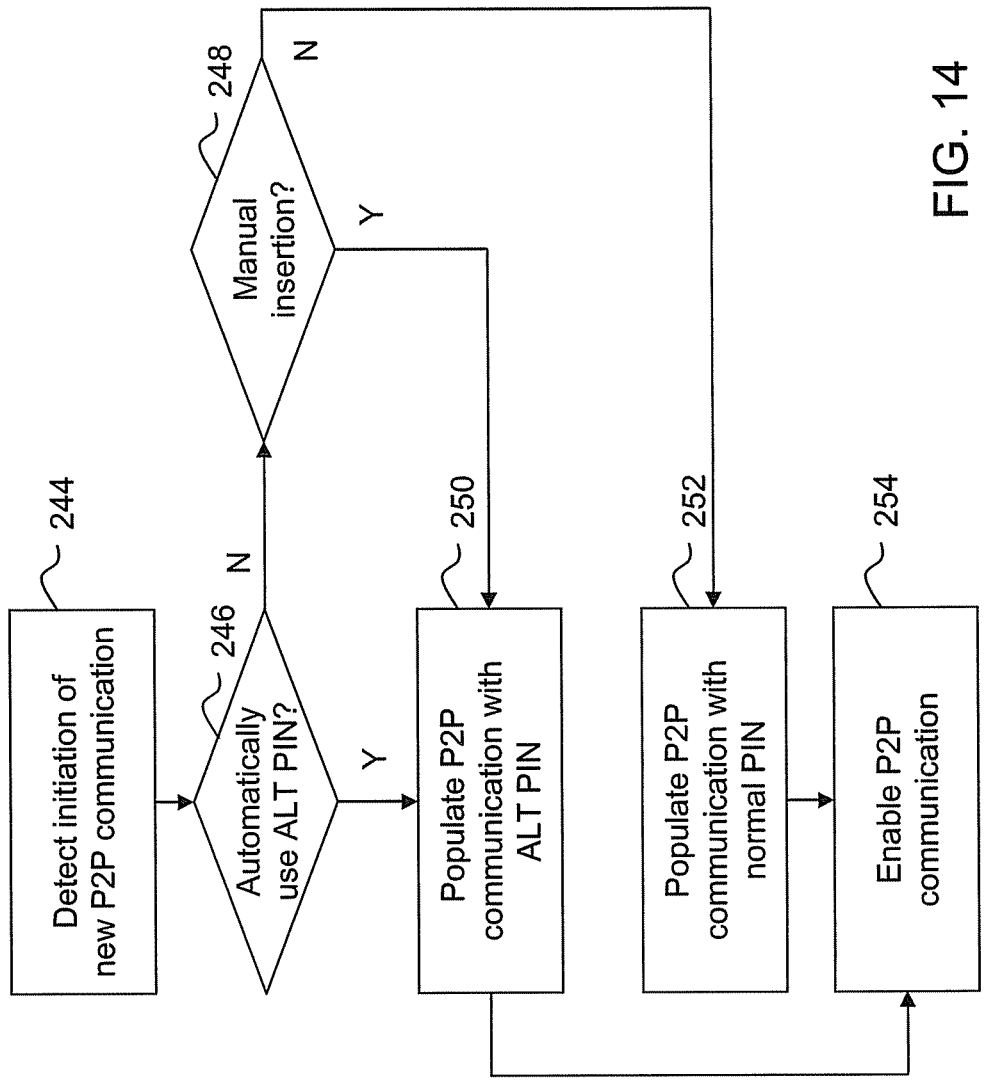
FIG. 14 is a flow chart illustrating an example of a set of computer executable instructions for using an alternative PIN.

Referring now to FIG. 14, an example set of computer executable operations are shown that may be executed by the mobile device 10 in enabling a P2P communication. At 244, initiation of a new P2P communication is detected. For example, a new IM message may be initiated in an IM P2P-based application 44, a new game move may be initiated in a P2P-based game application 44, etc. In this example, it may be assumed that the mobile device 10 comprises an ALT PIN 49 that it may use instead of a normal PIN 47. At 246 it is determined whether or not the ALT PIN 49 should be used automatically. This can be determined in various ways. For example, if a particular contact is being communication with, and that contact is meant to be communicated with using the ALT PIN 49 (e.g. has been selected from tool 70 in FIG. 8). In another embodiment, the ALT PIN 49 may be mandated for automatic use for all P2P communications with the particular application 44. For example, a newly downloaded application 44 may require that during a trial period an ALT PIN 49 be used to protect the normal pin 47 in the event that the application 44 is not permanently installed later.

If automatic use of the ALT PIN 49 is not applicable for the new P2P communication initiated at 244, it may be determined at 248 whether or not manual insertion of the ALT PIN 49 has been detected. For example, when sending a new P2P message 20, the user may choose to use the ALT PIN 49 for a particular contact and may event use both the normal PIN 47 and ALT PIN 49 for multiple recipients of the same P2P message 20 as will be discussed below. If no manual insertion is detected at 248, the P2P communication (e.g. P2P message 20) is populated with the normal PIN 47 at 252 in this example. This may comprise populating the source field 28 with the normal pin 47 rather than the ALT PIN 49.

If automatic insertion or manual insertion is detected at one of 246 and 248, the P2P communication is populated with the ALT PIN 49 at 250.

Once the P2P communication has been populated using one or more of the normal PIN 47 and the ALT PIN 49, the P2P communication is enables at 254, e.g. to have it sent to one or more recipients. It will be appreciated that the example shown in FIG. 14 may be repeated for each contact being added to the P2P communication (i.e. in a multi-recipient communication) and different iterations may add either the normal PIN 47 or the ALT PIN 49 such that the P2P communication designates both as will be explained in greater detail below.

Figure 15:
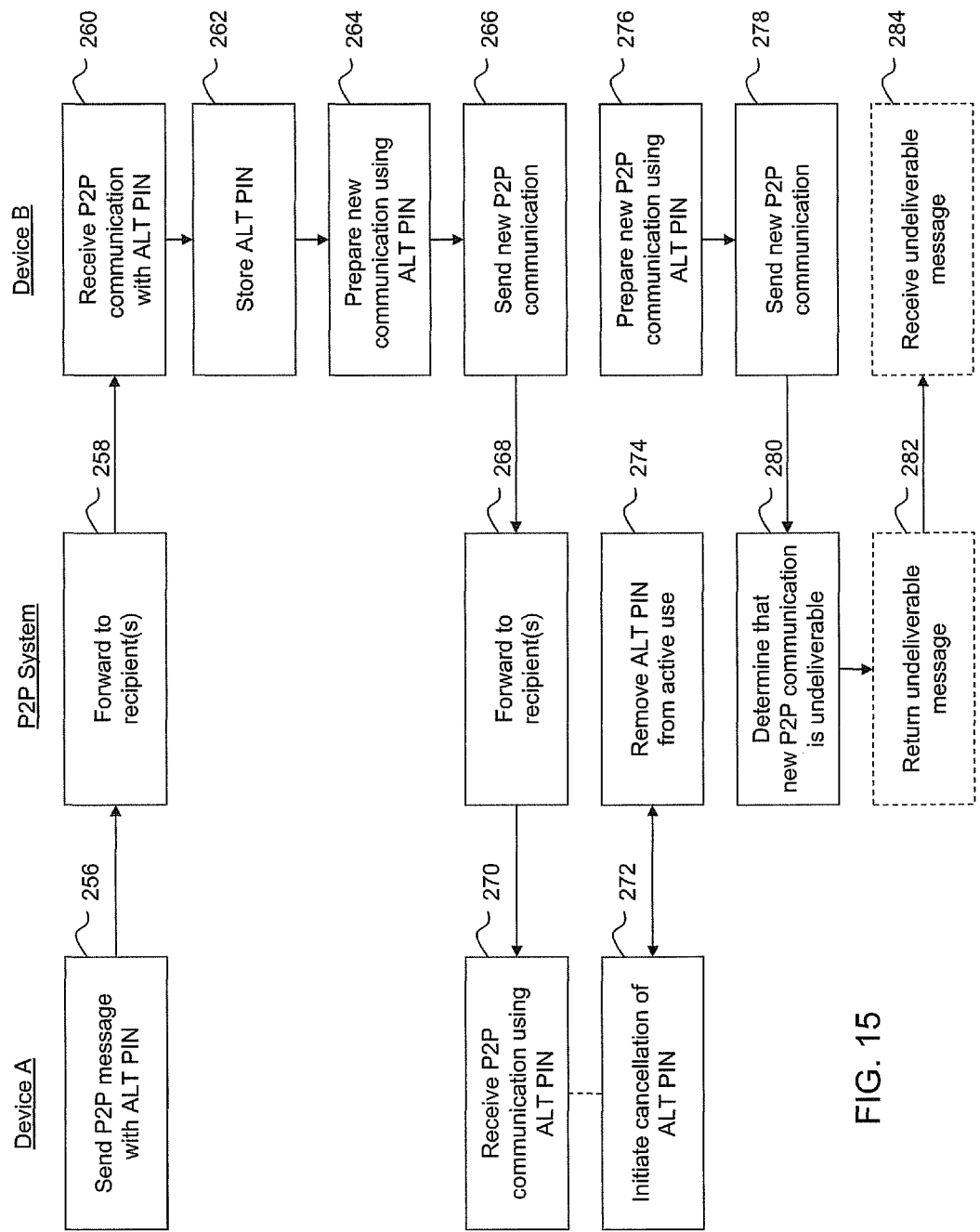
FIG. 15 is a flow chart illustrating an example of a set of computer executable instructions for communicating using an alternative PIN and subsequently cancelling the alternative PIN.

FIG. 15 illustrates one example scenario wherein a first mobile device 10, Device A, communicates with a second mobile device 10, Device B, via the P2P system 16. In this example, at 256, Device A sends a P2P message 20 using an ALT PIN 49, and such message 20 is directed to at least Device B. The P2P system 16 forwards the P2P message 20 to one or more recipients at 258, which includes Device B. Device B then receives the P2P message 20 at 260, which includes the ALT PIN 49. If in the P2P message 20 just received is the first that uses the ALT PIN 49 (as is assumed in this example for illustrative purposes), the ALT PIN 49 is stored by Device B at 262. In this example, Device B then wishes to reply to Device A, e.g. in an IM conversation, P2P game, etc. At 264, Device B prepares a new communication which uses the ALT PIN 49 associated with Device A, and the P2P communication is sent at 266. The P2P communication is forwarded by the P2P system 16 at 268 to one or more recipients which in this example includes Device A. Device A then receives the P2P communication sent by Device B using the ALT PIN 49 at 270.

To illustrate an effect of cancelling or de-activating the ALT PIN 49 used in operations 256 through 270, initiation of a cancellation of the ALT PIN 49 can be performed at 272. This may then cause an exchange with the P2P system 16 at 274 to enable the P2P system 16 to remove that ALT PIN 49 from active use (e.g. remove or de-activate). At some point subsequent to 272 and 274 in this example, Device B prepares a new P2P communication at 276 using the ALT PIN 49 (which has been since cancelled or de-activated). The new P2P communication is then sent, ostensibly, to Device A via the P2P system 16 at 278. The P2P system 16 having previously cancelled or de-activated that ALT PIN 49 determines at 280 that the new P2P communication is undeliverable to Device A using the ALT PIN 49. In some embodiments, as shown in dashed lines in FIG. 15, the P2P system 16 may be operable to return an undeliverable message to Device B at 282, which is received at 284. However, it can be appreciated that in some embodiments such an undeliverable message may be undesirable as Device A may not wish to actively flag to Device B that the ALT PIN 49 given to them is no longer valid. By not returning an undeliverable message, Device B would not know whether or not Device A received the message, which may be the desired outcome such that Device B eventually ceases trying to communicate with Device A.

Figure 16:
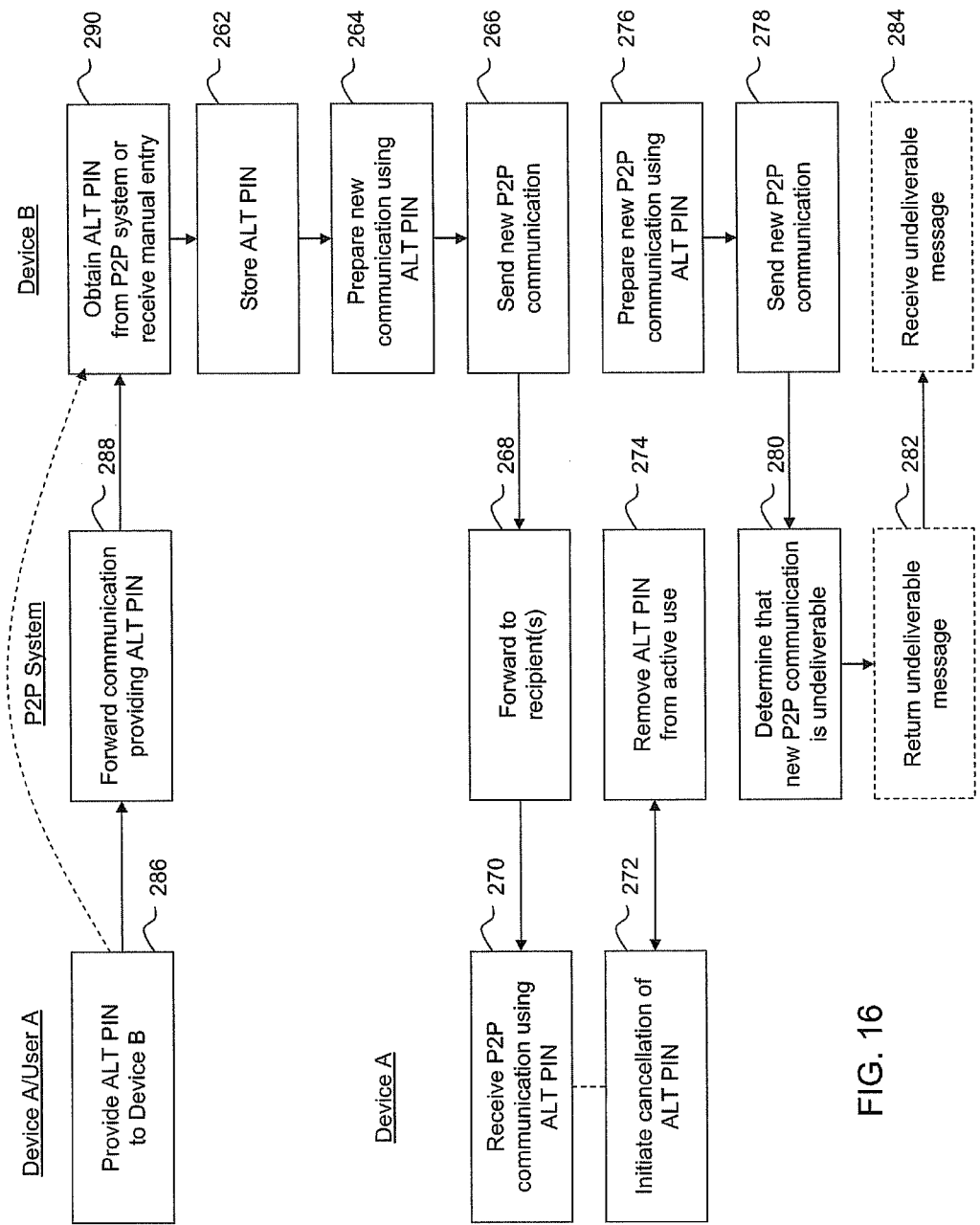
FIG. 16 is a flow chart illustrating another example of a set of computer executable instructions for communicating using an alternative PIN and subsequently cancelling the alternative PIN.

In the example shown in FIG. 15, Device A provides the ALT PIN 49 to Device B via a P2P communication. In other scenarios, as shown in FIG. 16, Device A or the user associated with Device A (User A) may instead provide the ALT PIN 49 to Device B out-of-band with respect to the P2P system 16 (e.g. by having a user associated with Device B manually enter the ALT PIN 49 in a contact list or application 44, or using another form of communication such as voice, SMS, etc.) as suggested by the dashed line in FIG. 16. At 286 in this example, either Device A or User A provides the ALT PIN 49 to Device B. This may be done out-of-band as noted above, or via the P2P system 16 at 288, e.g. using a PIN provisioning protocol or other mechanism. At 290, Device B obtains the ALT PIN 49 from the P2P system 16 or directly from a manual entry or otherwise such that it may be stored at 262 as discussed above with respect to FIG. 15. It can be appreciated that operations 262 through 284 in FIG. 16 are similar or identical to those shown in FIG. 15 and thus details thereof will not be repeated.

Figure 17:
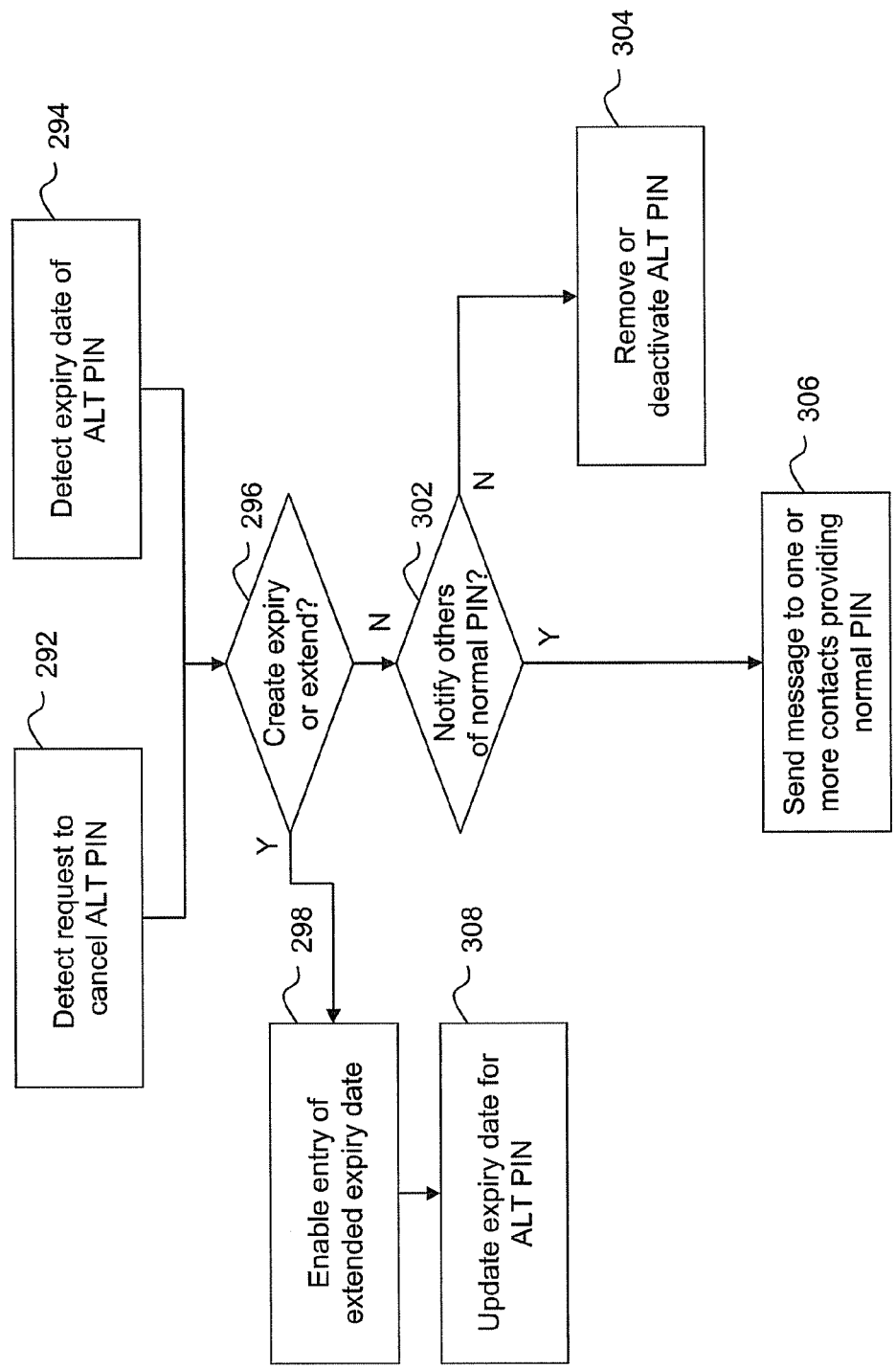
FIG. 17 is a flow chart illustrating another example of a set of computer executable instructions for providing options upon detecting an expiry data of an alternative PIN or a request to cancel an alternative PIN.

Turning now to FIG. 17, an example set of computer executable operations is shown for addressing a cancellation request or approaching expiry date for an ALT PIN 49 in order to remove or de-activate an ALT PIN 49 from use. The mobile device 10 (or an application 44 thereon) may detect a request to cancel or de-activate the ALT PIN 49 at 292 or may detect an expiry date for the ALT PIN 49 at 294. As discussed above, both scenarios may enable the user to extend the expiry date or otherwise create an expiry date rather than have the ALT PIN 49 cancelled or de-activated at that time. The mobile device 10 thus determines at 296 whether or not an expiry date for the ALT PIN 49 in question should be created or extended. If so, entry of an extended expiry date is enabled at 298 and the expiry date for the ALT PIN 49 updated at 308. The updating at 308 may comprise notifying the P2P system 16 so that it is aware of the new expiry date, e.g. in configurations wherein the P2P system 16 also associates an expiry date with the ALT PIN 49. If the expiry date is not to be created or extended at 296, the mobile device 10 may then determine at 302 whether or not one or more contacts are to be updated concerning the expiry, in particular whether or not other should be notified of the normal PIN 47. If not, the ALT PIN 49 is removed or de-activated at 304. If one or more contacts are to be notified, a message (e.g. P2P message 20) may be sent to such contacts at 306 enabling the respective devices to replace or otherwise convert the ALT PIN 49 to the normal PIN 47. It can be appreciated that the message sent in 306 may be visible to respective users of those contacts being notified or may be transparent. If transparent, the message being sent may be handled by a particular application on the recipient device without notifying the respective user.

As discussed above, in some embodiments, the mobile device 10 may be operable to populate a P2P message 20 with both the normal PIN 47 and the ALT PIN 49 in a multi-recipient communication in order to allow both types of recipients to receive the same P2P message 20. This may be done by the mobile device 10 automatically duplicating the P2P message 20 being sent with different PINs being used in the source field 28. This enables a multi-recipient communication without having to change any components or behaviour of the P2P system 16. If a multi-cast mechanism is desired, a modified P2P message 20' as shown in FIG. 18 could instead be used. As seen in FIG. 18, the source field 28 may be split into a first source (SRC1) 28' and a second source (SRC2) 29, and the destination 30 split into a first destination (DEST1) 30' and a second destination (DEST2) 31. This would allow those recipients in DEST2 31 to receive a P2P message 20 indicating the ALT PIN 49 in SRC2 29, while those recipients in DEST1 30' would receive a regular P2P message 20 showing the normal PIN 47. As illustrated in FIG. 19, this allows the mobile device 10 to generate a single message 20' with split fields and the P2P system 16 forward two different types of messages 20, each containing either the normal PIN 47 or the ALT PIN 49.

An example set of computer executable operations is shown in FIG. 20 to illustrate the configuration shown in FIGS. 18 and 19. At 310, Device A detects initiation of a new P2P communication. In this example, Device A also detects both a request to use the ALT PIN 49 at 312 and that one or more other recipients is to be communicated with using the normal PIN 47 at 314. The new P2P communication is then populated at 316 using both PINs 47, 49, e.g. as shown in FIG. 18 and sent to the multiple recipients indicated. The P2P system 16 receives the multi-recipient communication at 318 and proceeds to send copies of the communication to the respective recipients, according to which split destination field 30', 31 they are in. At 320, for normal PIN 47 recipients, the ALT PIN 49 is removed from the communication and a P2P communication using the normal PIN 47 is sent at 322 and received by, in this example Devices B and C at 324. Similarly, for ALT PIN 49 recipients, the normal PIN 47 is removed at 326, a P2P communication sent using the ALT PIN 49 at 328, which is received, by Device D in this example, at 330. It can be appreciated that removing one or the other of the PINs 47, 49 is only one example mechanism for enabling the P2P communication to be sent to both types of recipients. Instead, for example, the PIN 47, 49 that is not be divulged can be encrypted or otherwise hidden rather than removed. Also, if it is determined that a normal PIN 47 recipient can also receive the ALT PIN 49 without any breach of privacy or policy, operation 320 may not be needed. It may therefore be appreciated that the example shown in FIG. 20 is for illustrative purposes only and various other methods may be employed within the principles herein described.

Figure 21:
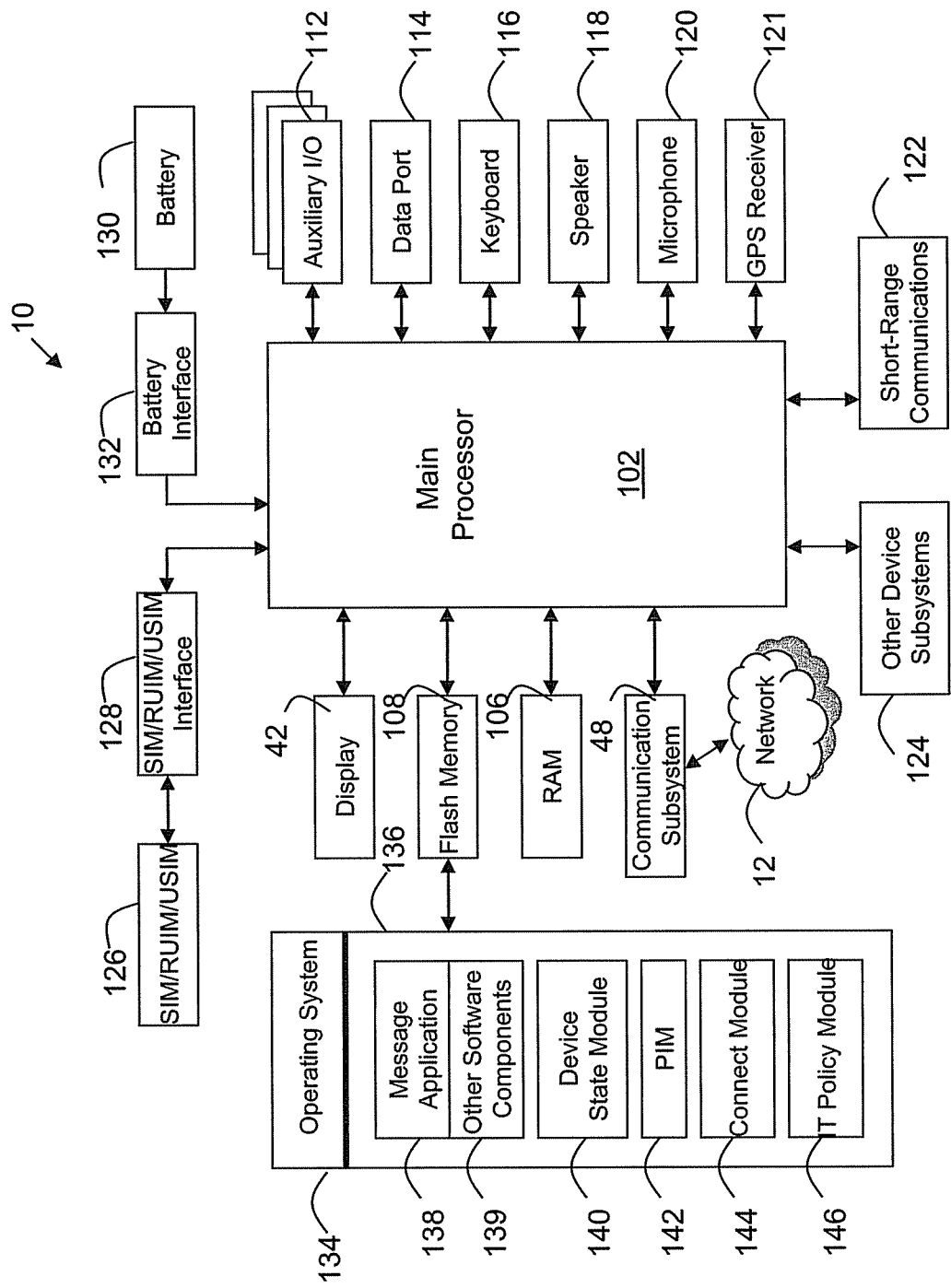
FIG. 21 is a block diagram of an example configuration for a mobile device.

Referring now to FIG. 21, shown therein is a block diagram of an example embodiment of a mobile device 10. The mobile device 10 comprises a number of components such as a main processor 102 that controls the overall operation of the mobile device 10. Communication functions, including data and voice communications, are performed through a communication subsystem 48. The communication subsystem 48 receives messages from and sends messages to a wireless network 12. In this example embodiment of the mobile device 10, the communication subsystem 48 is configured in accordance with the Global System for Mobile Communication (GSM) and General Packet Radio Services (GPRS) standards. The GSM/GPRS wireless network is used worldwide and it is expected that these standards will be superseded eventually by 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 48 with the wireless network 12 represents one or more different Radio Frequency (RF) channels, operating according to defined protocols specified for GSM/GPRS communications. With newer network protocols, these channels are capable of supporting both circuit switched voice communications and packet switched data communications.

The main processor 102 also interacts with additional subsystems such as a Random Access Memory (RAM) 106, a flash memory 108, a display 42, an auxiliary input/output (I/O) subsystem 112, a data port 114, a keyboard 116, a speaker 118, a microphone 120, GPS receiver 121, short-range communications 122 and other device subsystems 124.

Some of the subsystems of the mobile device 10 perform communication-related functions, whereas other subsystems may provide "resident" or on-device functions. By way of example, the display 42 and the keyboard 116 may be used for both communication-related functions, such as entering a text message for transmission over the network 12, and device-resident functions such as a calculator or task list.

The mobile device 10 can send and receive communication signals over the wireless network 12 after required network registration or activation procedures have been completed. Network access is associated with a subscriber or user of the mobile device 10. To identify a subscriber, the mobile device 10 may use a subscriber module. Examples of such subscriber modules include a Subscriber Identity Module (SIM) developed for GSM networks, a Removable User Identity Module (RUIM) developed for CDMA networks and a Universal Subscriber Identity Module (USIM) developed for 3G networks such as UMTS. In the example shown, a SIM/RUIM/USIM 126 is to be inserted into a SIM/RUIM/USIM interface 128 in order to communicate with a network. The SIM/RUIM/USIM component 126 is one type of a conventional "smart card" that can be used to identify a subscriber of the mobile device 10 and to personalize the mobile device 10, among other things. Without the component 126, the mobile device 10 may not be fully operational for communication with the wireless network 12. By inserting the SIM/RUIM/USIM 126 into the SIM/RUIM/USIM interface 128, a subscriber can access all subscribed services. Services may include: web browsing and messaging such as e-mail, voice mail, SMS, and MMS. More advanced services may include: point of sale, field service and sales force automation. The SIM/RUIM/USIM 126 includes a processor and memory for storing information. Once the SIM/RUIM/USIM 126 is inserted into the SIM/RUIM/USIM interface 128, it is coupled to the main processor 102. In order to identify the subscriber, the SIM/RUIM/USIM 126 can include some user parameters such as an International Mobile Subscriber Identity (IMSI). An advantage of using the SIM/RUIM/USIM 126 is that a subscriber is not necessarily bound by any single physical mobile device. The SIM/RUIM/USIM 126 may store additional subscriber information for a mobile device as well, including datebook (or calendar) information and recent call information. Alternatively, user identification information can also be programmed into the flash memory 108.

The mobile device 10 is typically a battery-powered device and includes a battery interface 132 for receiving one or more batteries 130 (typically rechargeable). In at least some embodiments, the battery 130 can be a smart battery with an embedded microprocessor. The battery interface 132 is coupled to a regulator (not shown), which assists the battery 130 in providing power V+ to the mobile device 10. Although current technology makes use of a battery, future technologies such as micro fuel cells may provide the power to the mobile device 10.

The mobile device 10 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 10 during its manufacture. Other software applications include a message application 138 that can be any suitable software program that allows a user of the mobile device 10 to send and receive electronic messages. Various alternatives exist for the message application 138 as is well known to those skilled in the art. Messages that have been sent or received by the user are typically stored in the flash memory 108 of the mobile device 10 or some other suitable storage element in the mobile device 10. In at least some embodiments, some of the sent and received messages may be stored remotely from the mobile device 10 such as in a data store of an associated host system that the mobile device 10 communicates with.

The software applications can further comprise a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 10 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 12. PIM data items may be seamlessly integrated, synchronized, and updated via the wireless network 12 with the mobile device subscriber's corresponding data items stored and/or associated with a host computer system. This functionality creates a mirrored host computer on the mobile device 10 with respect to such items. This can be particularly advantageous when the host computer system is the mobile device subscriber's office computer system.

The mobile device 10 may also comprise a connect module 144, and an IT policy module 146. The connect module 144 implements the communication protocols that are required for the mobile device 10 to communicate with the wireless infrastructure and any host system, such as an enterprise system, that the mobile device 10 is authorized to interface with.

The connect module 144 includes a set of APIs that can be integrated with the mobile device 10 to allow the mobile device 10 to use any number of services associated with the enterprise system. The connect module 144 allows the mobile device 10 to establish an end-to-end secure, authenticated communication pipe with a host system (not shown). A subset of applications for which access is provided by the connect module 144 can be used to pass IT policy commands from the host system to the mobile device 10. This can be done in a wireless or wired manner. These instructions can then be passed to the IT policy module 146 to modify the configuration of the device 10. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 106 in its native form. After the IT policy data is stored, a global notification can be sent by the IT policy module 146 to all of the applications residing on the mobile device 10. Applications for which the IT policy may be applicable then respond by reading the IT policy data to look for IT policy rules that are applicable.

Other types of software applications or components 139 can also be installed on the mobile device 10. These software applications 139 can be pre-installed applications (i.e. other than message application 138) or third party applications, which are added after the manufacture of the mobile device 10. Examples of third party applications include games, calculators, utilities, etc.

The additional applications 139 can be loaded onto the mobile device 10 through at least one of the wireless network 12, the auxiliary I/O subsystem 112, the data port 114, the short-range communications subsystem 122, or any other suitable device subsystem 124. This flexibility in application installation increases the functionality of the mobile device 10 and may provide enhanced on-device functions, communication-related functions, or both. For example, secure communication applications may enable electronic commerce functions and other such financial transactions to be performed using the mobile device 10.

The data port 114 enables a subscriber to set preferences through an external device or software application and extends the capabilities of the mobile device 10 by providing for information or software downloads to the mobile device 10 other than through a wireless communication network. The alternate download path may, for example, be used to load an encryption key onto the mobile device 10 through a direct and thus reliable and trusted connection to provide secure device communication.

The data port 114 can be any suitable port that enables data communication between the mobile device 10 and another computing device. The data port 114 can be a serial or a parallel port. In some instances, the data port 114 can be a USB port that includes data lines for data transfer and a supply line that can provide a charging current to charge the battery 130 of the mobile device 10.

The short-range communications subsystem 122 provides for communication between the mobile device 10 and different systems or devices, without the use of the wireless network 12. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download may be processed by the communication subsystem 48 and input to the main processor 102. The main processor 102 may then process the received signal for output to the display 42 or alternatively to the auxiliary I/O subsystem 112. A subscriber may also compose data items, such as e-mail messages, for example, using the keyboard 116 in conjunction with the display 42 and possibly the auxiliary I/O subsystem 112. The auxiliary subsystem 112 may comprise devices such as: a touch screen, mouse, track ball, infrared fingerprint detector, or a roller wheel with dynamic button pressing capability. The keyboard 116 is an alphanumeric keyboard and/or telephone-type keypad. However, other types of keyboards may also be used, such as a virtual or "soft" keyboard rendered as images on a touch screen. A composed item may be transmitted over the wireless network 12 through the communication subsystem 48.

For voice communications, the overall operation of the mobile device 10 in this example is substantially similar, except that the received signals are output to the speaker 118, and signals for transmission are generated by the microphone 120. Alternative voice or audio I/O subsystems, such as a voice message recording subsystem, can also be implemented on the mobile device 10. Although voice or audio signal output is accomplished primarily through the speaker 118, the display 42 can also be used to provide additional information such as the identity of a calling party, duration of a voice call, or other voice call related information.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, any component of or related to the wireless infrastructure 14, etc., or accessible or connectable thereto. Any application or module herein described may be implemented using computer readable/executable instructions that may be stored or otherwise held by such computer readable media.

It will also be appreciated that the example embodiments and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

Although the above has been described with reference to certain specific embodiments, various modifications thereof will be apparent to those skilled in the art without departing from the scope of the claims appended hereto.

The invention claimed is:

1. A method for enabling peer-to-peer (P2P) communications over a network between a first electronic device and at least two other electronic devices coupled to the network, the method comprising:
    sending at least one P2P communication to a second electronic device using a source address of a first electronic device used for addressing P2P communications over the network;
    substituting the source address of the first electronic device with an alternative identifier for the source address for communicating with a third electronic device;
    sending at least one P2P communication to the third electronic device using the alternative identifier to conceal the source address from the third electronic device for the at least one P2P communication to the third electronic device; and
    removing or de-activating the alternative identifier after detecting an expiry date for the alternative identifier or a request to cancel the alternative identifier, to subsequently inhibit P2P communications from being received from at least the third electronic device.

2. The method according to claim 1, further comprising enabling the expiry date to be extended, wherein the removing or de-activating is deferred until an extended expiry date.

3. The method according to claim 1, wherein the sending comprises one or more of a manual insertion of the alternative identifier into the P2P communication, and an automatic insertion of the alternative identifier into the P2P communication.

4. The method according to claim 1, further comprising the first electronic device generating the alternative identifier and registering the alternative identifier with a P2P system.

5. The method according to claim 1, further comprising the first electronic device sending a request for the alternative identifier to a P2P system, and the first electronic device receiving the alternative identifier from the P2P system.

6. The method according to claim 1, wherein the P2P communication comprises multiple recipients, and wherein the sending comprises enabling the P2P communication to be sent to at least the third electronic device using the alternative identifier and at least one additional electronic device using the source address.

7. A method for enabling peer-to-peer (P2P) communications over a network between at least two electronic devices coupled to the network, the method comprising:
    a P2P system associating a source address with a first electronic device to enable P2P communications with at least one second electronic device using the source address;
    the P2P system associating an alternative identifier with the first electronic device for enabling P2P communications with at least one third electronic device using the alternative identifier, the alternative identifier being used as a substitute for the source address for the first electronic device used for addressing P2P communications with the at least one third electronic device over the network;
    enabling at least one P2P communication sent by the first electronic device using the alternative identifier to be sent to the at least one third electronic device to conceal the source address from the at least one third electronic device for the P2P communication to the at least one third device; and
    removing or de-activating the alternative identifier after detecting an expiry date for the alternative identifier or a request to cancel the alternative identifier, to subsequently inhibit P2P communications from being sent to the first electronic device by the at least one third electronic device.

8. The method according to claim 7, further comprising receiving a request from the first electronic device for the alternative identifier, and sending the alternative identifier to the first electronic device.

9. The method according to claim 7, wherein the P2P communication comprises multiple recipients, and wherein the enabling comprises enabling the P2P communication to be sent to the at least one third electronic device using the alternative identifier and to at least one second electronic device using the source address.

10. A first electronic device for enabling peer-to-peer (P2P) communications over a network between the first electronic device and at least one other electronic device coupled to the network, the first electronic device comprising a processor and memory, the memory comprising computer executable instructions for:
- sending at least one P2P communication to a second electronic device using a source address of a first electronic device used for addressing P2P communications over the network;
- substituting the source address of the first electronic device with an alternative identifier for the source address for communicating with a third electronic device;
- sending at least one P2P communication to the third electronic device using the alternative identifier to conceal the source address from the third electronic device for the at least one P2P communication to the third electronic device; and
- removing or de-activating the alternative identifier after detecting an expiry date for the alternative identifier or a request to cancel the alternative identifier, to subsequently inhibit P2P communications from being received from at least the third electronic device.

11. The non-transitory computer readable medium according to claim 10, the computer executable instructions further comprising instructions for enabling the expiry date to be extended, wherein the removing or de-activating is deferred until an extended expiry date.

12. A peer-to-peer (P2P) system for enabling P2P communications over a network between at least two electronic devices coupled to the network, the P2P system comprising a processor and memory, the memory comprising computer executable instructions for:
- associating a source address with a first electronic device to enable P2P communications with at least one second electronic device using the source address;
- associating an alternative identifier with the first electronic device for enabling P2P communications with at least one third electronic device using the alternative identifier, the alternative identifier being used as a substitute for the source address for the first electronic device used for addressing P2P communications with the at least one third electronic device over the network;
- enabling at least one P2P communication sent by the first electronic device using the alternative identifier to be sent to the at least one third electronic device to conceal the source address from the at least one third electronic device for the P2P communication to the at least one third device; and
- removing or de-activating the alternative identifier after detecting an expiry date for the alternative identifier or a request to cancel the alternative identifier, to subsequently inhibit P2P communications from being sent to the first electronic device by the at least one third electronic device.

13. A non-transitory computer readable medium comprising computer executable instructions for enabling peer-to-peer (P2P) communications over a network between a first electronic device and at least two other electronic devices coupled to the network, the computer readable medium comprising instructions for:
- sending at least one P2P communication to a second electronic device using a source address of a first electronic device used for addressing P2P communications over the network;
- substituting the source address of the first electronic device with an alternative identifier for the source address for communicating with a third electronic device;
- sending at least one P2P communication to the third electronic device using the alternative identifier to conceal the source address from the third electronic device for the at least one P2P communication to the third electronic device; and
- removing or de-activating the alternative identifier after detecting an expiry date for the alternative identifier or a request to cancel the alternative identifier, to subsequently inhibit P2P communications from being received from at least the third electronic device.

14. A non-transitory computer readable medium comprising computer executable instructions for enabling peer-to-peer (P2P) communications over a network between at least two electronic devices coupled to the network, the computer readable medium comprising instructions for:
- a P2P system associating a source address with a first electronic device to enable P2P communications with at least one second electronic device using the source address;
- the P2P system associating an alternative identifier with the first electronic device for enabling P2P communications with at least one third electronic device using the alternative identifier, the alternative identifier being used as a substitute for the source address for the first electronic device used for addressing P2P communications with the at least one third electronic device over the network;
- enabling at least one P2P communication sent by the first electronic device using the alternative identifier to be sent to the at least one third electronic device to conceal the source address from the at least one third electronic device for the P2P communication to the at least one third device; and
- removing or de-activating the alternative identifier after detecting an expiry date for the alternative identifier or a request to cancel the alternative identifier, to subsequently inhibit P2P communications from being sent to the first electronic device by the at least one third electronic device.

15. The non-transitory computer readable medium according to claim 13, wherein the sending comprises one or more of a manual insertion of the alternative identifier into the P2P communication, and an automatic insertion of the alternative identifier into the P2P communication.

16. The non-transitory computer readable medium according to claim 13, the computer executable instructions further comprising instructions for generating the alternative identifier and registering the alternative identifier with a P2P system.

17. The non-transitory computer readable medium according to claim 13, the computer executable instructions further comprising instructions for sending a request for the alternative identifier to a P2P system, and the first electronic device receiving the alternative identifier from the P2P system.

18. The non-transitory computer readable medium according to claim 13, wherein the P2P communication comprises multiple recipients, and wherein the sending comprises enabling the P2P communication to be sent to at least the third electronic device using the alternative identifier and at least one additional electronic device using the source address.

19. The non-transitory computer readable medium according to claim 14, the computer executable instructions further comprising instructions for receiving a request from the first electronic device for the alternative identifier, and sending the alternative identifier to the first electronic device.

20. The non-transitory computer readable medium according to claim 14, wherein the P2P communication comprises multiple recipients, and wherein the enabling comprises enabling the P2P communication to be sent to the at least one third electronic device using the alternative identifier and to at least one second electronic device using the source address.

* * * * *